US012748367B2

(12) United States Patent
Tsujimoto et al.

(10) Patent No.: US 12,748,367 B2
(45) Date of Patent: Sep. 29, 2026

(54) FUSER AND IMAGE FORMING APPARATUS TO TRANSMIT DIFFERENT TYPES OF SIGNALS FROM FUSER TO IMAGE FORMING APPARATUS VIA COMMON TERMINAL

(71) Applicant: BROTHER KOGYO KABUSHIKI KAISHA, Nagoya (JP)

(72) Inventors: Yoshiyuki Tsujimoto, Nagoya (JP); Shuji Kawasaki, Nagoya (JP); Toshinori Araki, Nagoya (JP); Nobuyuki Tanaka, Konan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/086,595

(22) Filed: Mar. 21, 2025

(65) Prior Publication Data

US 2025/0334905 A1 Oct. 30, 2025

(30) Foreign Application Priority Data

Apr. 26, 2024 (JP) ................................ 2024-072281

(51) Int. Cl.
*G03G 15/20* (2006.01)
*G03G 15/00* (2006.01)

(52) U.S. Cl.
CPC ..... *G03G 15/2039* (2013.01); *G03G 15/2064* (2013.01); *G03G 15/80* (2013.01); *G03G 2215/00084* (2013.01)

(58) Field of Classification Search
CPC .......... G03G 15/2039; G03G 15/2064; G03G 15/80; G03G 2215/00084
See application file for complete search history.

(56) References Cited

U.S. PATENT DOCUMENTS

| | | | | |
|---|---|---|---|---|
| 2010/0290822 A1* | 11/2010 | Hasegawa .......... | G03G 15/2064 399/329 |
| 2020/0241452 A1* | 7/2020 | Saitoh ................ | G03G 15/2039 |
| 2023/0213881 A1* | 7/2023 | Kojima .............. | G03G 15/2039 399/33 |

FOREIGN PATENT DOCUMENTS

| | | |
|---|---|---|
| JP | H06-230619 A | 8/1994 |
| JP | H09-197879 A | 7/1997 |
| JP | 2001-318572 A | 11/2001 |
| JP | 2007-041392 A | 2/2007 |

(Continued)

*Primary Examiner* — Sandra Brase

(74) *Attorney, Agent, or Firm* — Merchant & Gould P.C.

(57) ABSTRACT

A fuser configured to be removably attached to an image forming apparatus includes a heating rotatable body for heating a sheet, a heater for heating the heating rotatable body, a pressure rotatable body for nipping the sheet between the pressure rotatable body and the heating rotatable body, a temperature sensor for detecting a temperature of the heating rotatable body, a state detection sensor for detecting a state of the fuser, a fuser connector configured to be connected to a main body connector of the image forming apparatus when the fuser is attached to the image forming apparatus, and a relay board including a common terminal connected to the fuser connector. The relay board is connected to the temperature sensor and the state detection sensor and is configured to transmit respective signals output from the temperature sensor and the state detection sensor to the image forming apparatus via the common terminal.

9 Claims, 12 Drawing Sheets

(56) References Cited

FOREIGN PATENT DOCUMENTS

| | | | |
|---|---|---|---|
| JP | 2007-140370 | A | 6/2007 |
| JP | 2011-253122 | A | 12/2011 |
| JP | 2021-113856 | A | 8/2021 |

* cited by examiner

FUSER AND IMAGE FORMING APPARATUS TO TRANSMIT DIFFERENT TYPES OF SIGNALS FROM FUSER TO IMAGE FORMING APPARATUS VIA COMMON TERMINAL

REFERENCE TO RELATED APPLICATIONS

This application claims priority from Japanese Patent Application No. 2024-072281 filed on Apr. 26, 2024. The entire content of the priority application is incorporated herein by reference.

BACKGROUND ART

Heretofore, an image forming apparatus has been known that is configured to perform printing by heating a sheet with a toner image transferred thereon to fix the toner image on the sheet. The sheet is generally heated by a fuser heated by an energized heater. However, with continued use of the fuser, the quality of printing with the fuser gradually deteriorates. Therefore, the fuser is configured to be removably attached to the image forming apparatus, and is replaced at regular time intervals.

The fuser includes various sensors for managing the status of the fuser, such as a sensor for detecting a temperature of the fuser and a sensor for detecting whether the fuser is set in the image forming apparatus. In the known image forming apparatus, when the fuser is configured to be detachably attached to the image forming apparatus, signals from the sensors are relayed once through a relay board provided to the fuser device, and are further transmitted to a controller on the image forming apparatus side through a connector on the fuser side and a connector on the image forming apparatus side in a state where the fuser is connected to the image forming apparatus.

SUMMARY

From the point of view of reducing the cost and the size of the image forming apparatus, it is more desirable to have a smaller number of signal lines (equivalent to the number of connector terminals) for transmitting the signals from the sensors of the fuser to the image forming apparatus. On the other hand, there is a demand for the fuser to detect temperatures at more locations. However, if the number of sensors for detecting temperatures is increased, the number of signal lines will increase accordingly. Therefore, a technology to reduce the number of signal lines has been desired.

Aspects of the present disclosure are advantageous in providing one or more improved techniques for reducing the number of signal lines used to transmit signals from sensors in a fuser to an image forming apparatus (i.e., the number of signal lines connecting the fuser to the image forming apparatus).

According to aspects of the present disclosure, a fuser configured to be removably attached to an image forming apparatus is provided. The fuser includes a heating rotatable body, a heater, a pressure rotatable body, a temperature sensor, a state detection sensor, a fuser connector, and a relay board. The heating rotatable body is configured to heat a sheet. The heater is configured to heat the heating rotatable body. The pressure rotatable body is configured to nip the sheet between the pressure rotatable body and the heating rotatable body. The temperature sensor is configured to detect a temperature of the heating rotatable body. The state detection sensor is configured to detect a state of the fuser.

The fuser connector is configured to be connected to a main body connector of the image forming apparatus when the fuser is attached to the image forming apparatus. The relay board includes a common terminal connected to the fuser connector. The relay board is connected to the temperature sensor and the state detection sensor. The relay board is configured to transmit respective signals output from the temperature sensor and the state detection sensor to the image forming apparatus via the common terminal.

According to aspects of the present disclosure, further provided is an image forming apparatus that includes a fuser, a main body connector, and a control board. The control board includes a controller connected to the main body connector. The controller is configured to perform communication of signals with the fuser as attached to the image forming apparatus via the main body connector. The fuser is configured to be removably attached to the image forming apparatus. The fuser includes a heating rotatable body, a heater, a pressure rotatable body, a pressure contact/separation mechanism, a temperature sensor, a nip detection sensor, a fuser connector, and a relay board. The heating rotatable body is configured to heat a sheet. The heater is configured to heat the heating rotatable body. The pressure rotatable body is configured to nip the sheet between the pressure rotatable body and the heating rotatable body. The pressure contact/separation mechanism includes a gear. The pressure contact/separation mechanism is configured to switch between a pressure contact state in which the heating rotatable body and the pressure rotatable body are in pressure contact with each other and a separation state in which the heating rotatable body and the pressure rotatable body are separated from each other. The temperature sensor is configured to detect a temperature of the heating rotatable body. The nip detection sensor is configured to detect whether the pressure contact/separation mechanism is in the pressure contact state or the separation state. The fuser connector is configured to be connected to the main body connector of the image forming apparatus when the fuser is attached to the image forming apparatus. The relay board includes a common terminal connected to the fuser connector. The relay board is connected to the temperature sensor and the state detection sensor. The relay board is configured to transmit respective signals output from the temperature sensor and the state detection sensor to the image forming apparatus via the common terminal. The controller is further configured to receive input of signals transmitted via the common terminal. The pressure contact/separation mechanism is further configured to, when in the pressure contact state, block light from the nip detection sensor by the gear. The pressure contact/separation mechanism is further configured to, when in the separation state, not block the light from the nip detection sensor by the gear. The relay board is further configured to, when the light from the nip detection sensor is blocked, input a voltage corresponding to the temperature to be detected by the temperature sensor to the controller through the common terminal. The relay board is further configured to, when the light from the nip detection sensor is not blocked, input a particular voltage to the controller through the common terminal.

According to aspects of the present disclosure, further provided is an image forming apparatus that includes a fuser, a main body connector, and a control board. The control board includes a controller connected to the main body connector. The controller is configured to perform communication of signals with the fuser as attached to the image forming apparatus via the main body connector. The fuser is configured to be removably attached to the image forming apparatus. The fuser includes a heating rotatable body, a heater, a pressure rotatable body, a pressure contact/separation mechanism, a temperature sensor, a nip detection sensor, a fuser connector, and a relay board. The heating rotatable body is configured to heat a sheet. The heater is configured to heat the heating rotatable body. The pressure rotatable body is configured to nip the sheet between the pressure rotatable body and the heating rotatable body. The pressure contact/separation mechanism includes a gear. The pressure contact/separation mechanism is configured to switch between a pressure contact state in which the heating rotatable body and the pressure rotatable body are in pressure contact with each other and a separation state in which the heating rotatable body and the pressure rotatable body are separated from each other. The temperature sensor is configured to detect a temperature of the heating rotatable body. The nip detection sensor is configured to detect whether the pressure contact/separation mechanism is in the pressure contact state or the separation state. The fuser connector is configured to be connected to the main body connector of the image forming apparatus when the fuser is attached to the image forming apparatus. The relay board includes a common terminal connected to the fuser connector. The relay board is connected to the temperature sensor and the state detection sensor. The relay board is configured to transmit respective signals output from the temperature sensor and the state detection sensor to the image forming apparatus via the common terminal. The controller is further configured to receive input of signals transmitted via the common terminal. The pressure contact/separation mechanism is further configured to, when in the pressure contact state, not block light from the nip detection sensor by the gear. The pressure contact/separation mechanism is further configured to, when in the separation state, block the light from the nip detection sensor by the gear. The relay board is further configured to, when the light from the nip detection sensor is not blocked, input a voltage corresponding to the temperature to be detected by the temperature sensor to the controller through the common terminal. The relay board is further configured to, when the light from the nip detection sensor is blocked, input a particular voltage to the controller through the common terminal.

According to aspects of the present disclosure, further provided is an image forming apparatus that includes a fuser, a main body connector, and a control board. The control board includes a controller connected to the main body connector. The controller is configured to perform communication of signals with the fuser as attached to the image forming apparatus, via the main body connector. The fuser is configured to be removably attached to the image forming apparatus. The fuser includes a heating rotatable body, a heater, a pressure rotatable body, a pressure contact/separation mechanism, a plurality of temperature sensors, a state detection sensor, a fuser connector, and a relay board. The heating rotatable body is configured to heat a sheet. The heater is configured to heat the heating rotatable body. The pressure rotatable body is configured to nip the sheet between the pressure rotatable body and the heating rotatable body. The pressure contact/separation mechanism includes a gear. The pressure contact/separation mechanism is configured to switch between a pressure contact state in which the heating rotatable body and the pressure rotatable body are in pressure contact with each other and a separation state in which the heating rotatable body and the pressure rotatable body are separated from each other. The plurality of temperature sensors include a first temperature sensor and a second temperature sensor. The first temperature sensor is configured to detect a temperature of a first region of the heating rotatable body over which a smaller-size sheet does not pass when printing is performed on the smaller-size sheet. The smaller-size sheet has a width smaller than a specified size in an axial direction of the heating rotatable body. The second temperature sensor is configured to detect a temperature of a second region of the heating rotatable body over which the smaller-size sheet passes when printing is performed on the smaller-size sheet. The state detection sensor is configured to detect a state of the fuser. The fuser connector is configured to be connected to the main body connector of the image forming apparatus when the fuser is attached to the image forming apparatus. The relay board includes a common terminal and an output terminal. The common terminal is connected to the fuser connector. The relay board is connected to the plurality of temperature sensors and the state detection sensor. The relay board is configured to transmit respective signals output from the first temperature sensor and the state detection sensor to the image forming apparatus via the common terminal. The relay board is further configured to transmit a signal output from the second temperature sensor to the image forming apparatus via the output terminal. The control board is configured to store the temperature detected by the first temperature sensor in a memory. The control board is further configured to store the temperature detected by the second temperature sensor in the memory. The controller is further configured to determine that the smaller-size sheet is passing through the fuser when a trend of changes in the temperature detected by the first temperature sensor is different from a trend of changes in the temperature detected by the second temperature sensor.

DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

In the present disclosure, an inclusive OR, meaning that it includes either A or B or both, may be expressed as "A and/or B," "at least one of A or B," or "at least one selected from the group consisting of A and B." The same applies to a case where there are three or more selectable elements to consider.

The following describes a printer, which may be an example of an "image forming apparatus" according to aspects of the present disclosure, in first through third illustrative embodiments with reference to the accompanying drawings.

First Illustrative Embodiment

Figure 1:
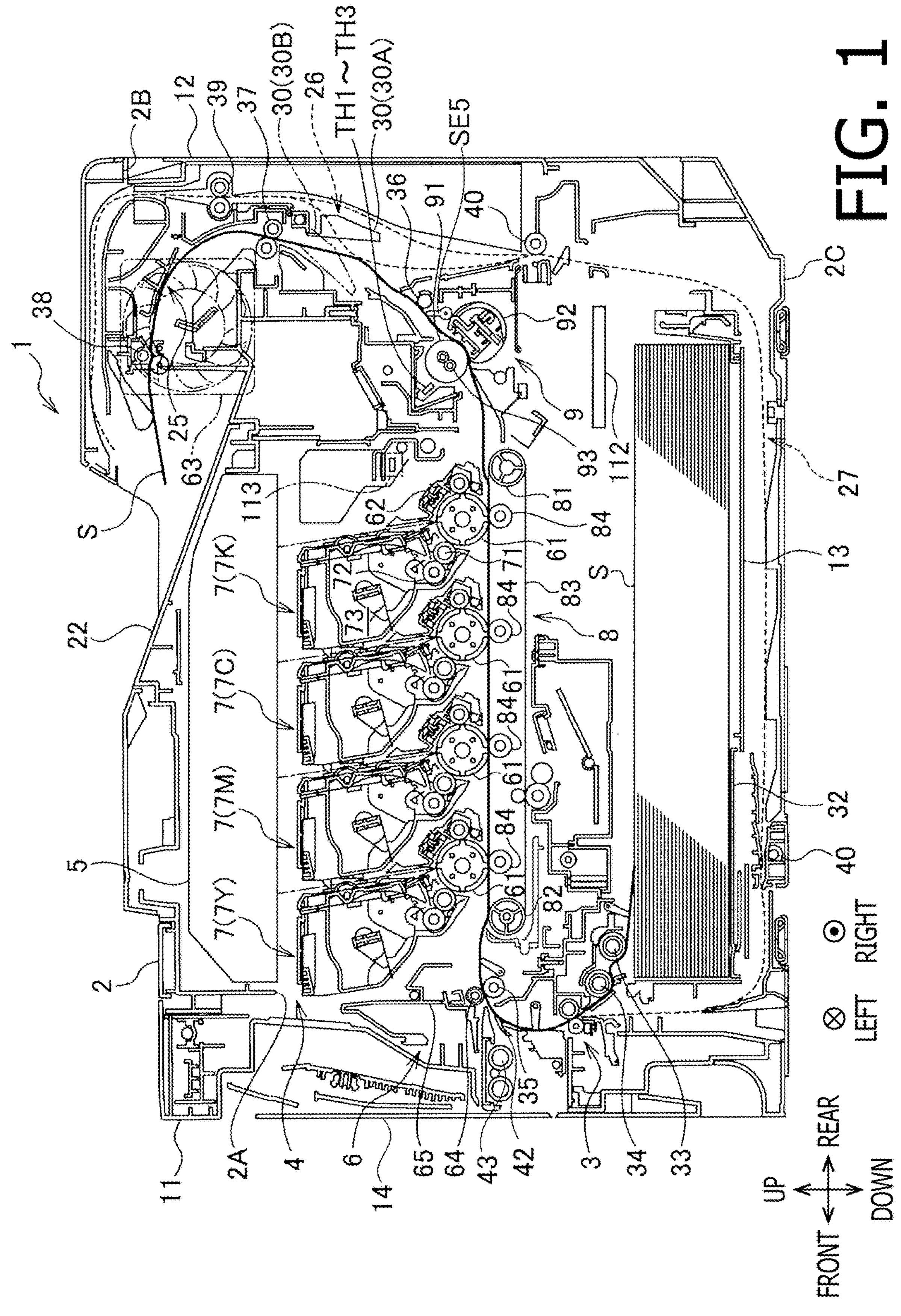
FIG. 1 is a cross-sectional side view schematically showing a configuration of a printer.

First, an overall configuration of a printer 1 in a first illustrative embodiment according to aspects of the present disclosure will be described. FIG. 1 schematically shows a configuration of the printer 1 in the first illustrative embodiment. In the following description, a front-rear direction, a left-right direction, and a vertical direction of the printer 1 are as shown in the relevant drawings.

Overall Configuration of Printer

The printer 1 in the first illustrative embodiment is an electrophotographic color laser printer configured to print an intended image on a sheet S. However, the printer 1 may be a monochrome laser printer. The printer 1 includes a main body housing 2, a conveyor 3, a process unit 4, and a fuser 9 configured to be removably attached to the main body housing 2.

The main body housing 2 includes a front cover 11, a rear cover 12, a feed tray 13, a discharge tray 22, a first conveyance path 25, a second conveyance path 26, and a third conveyance path 27. The front cover 11 is configured to open and close a front opening 2A provided at a front portion of the main body housing 2. The front cover 11 is attached to the front of the main body housing 2 in an openable and closable manner. The rear cover 12 is configured to open and close a rear opening 2B provided at a rear portion of the main body housing 2. The rear cover 12 is attached to the rear of the main body housing 2 in an openable and closable manner. The feed tray 13 is removably attached to a lower portion of the main body housing 2. The feed tray 13 is configured to support one or more sheets S placed thereon. The sheet S has a fixed size such as A4 size. For instance, the sheet S is a paper medium such as plain paper and cardboard. However, practicable examples of the sheet S are not limited to the above, but may include a transparency (i.e., an OHP film). The discharge tray 22 is disposed at an upper portion of the main body housing 2. The discharge tray 22 is configured to receive and support a discharged sheet S with an image formed thereon.

Further, a multipurpose tray (i.e., a manual feed tray) 14 is formed in a part of the front cover 11. The multipurpose tray 14 is configured to, when tilted forward, receive a sheet S manually fed therefrom. The printer 1 is configured to selectively perform printing not only on sheets S fed from the feed tray 13, but also on sheets S inserted from the multipurpose tray 14. The printer 1 is further configured to perform printing on sheets S of sizes other than the sheets S of a specified size (e.g., A4) placed on the feed tray 13 by inserting the sheets S of the other sizes from the multipurpose tray 14. Thus, the printer 1 is enabled to perform printing on sheets S (e.g., B5 size sheets and postcard size sheets) having widths smaller than the specified size.

Figure 8:
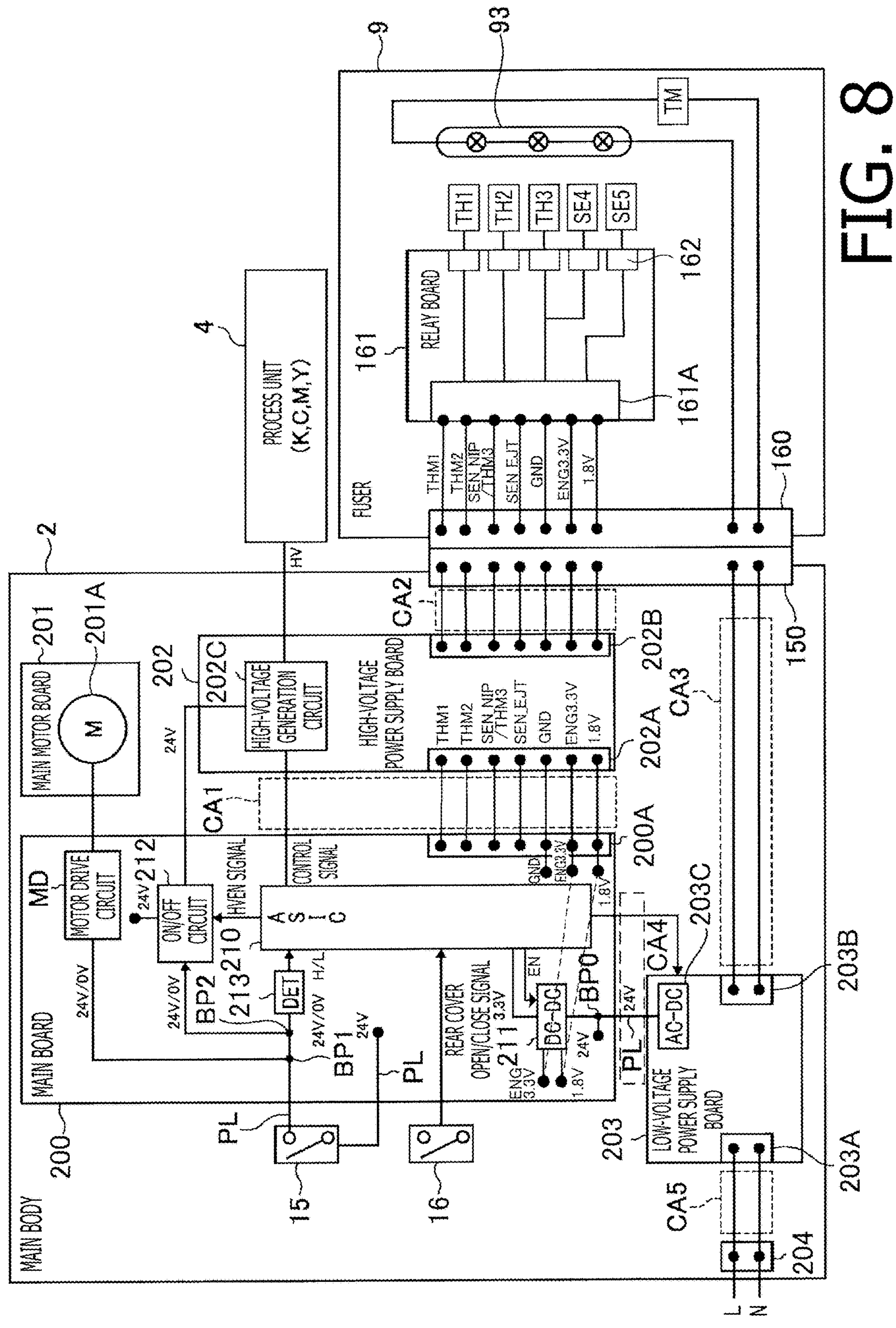
FIG. 8 shows an electrical configuration of the printer.

The conveyor 3 includes a pickup roller 33, a separation roller 34, a registration roller 35, a first conveyance roller 36, a second conveyance roller 37, a first switchback roller 38, a second switchback roller 39, a plurality of third conveyance rollers 40, a flapper 30, and a main motor 201A (see FIG. 8). A part of the second conveyance path 26 is formed by the closed rear cover 12.

The pickup roller 33 is configured to pick up sheets S in the feed tray 13 that are pressed upward by a sheet pressing plate 32 and to feed the sheets S toward the first conveyance path 25. The separation roller 34 is configured to separate the sheets S picked up by the pickup roller 33 on a sheet-by-sheet basis.

The registration roller 35 is disposed upstream of the process unit 4 in a conveyance direction along the first conveyance path 25. The registration roller 35 is configured to correct the misalignment of an orientation of a leading end of the sheet S, and then to convey the sheet S toward the process unit 4. The conveyance direction in which the registration roller 35 conveys the sheet S is a direction from the front to the rear.

To convey the sheet S out of the main body housing 2 with the rear cover 12 closed, the conveyor 3 conveys the sheet S from the process unit 4 by the first conveyance roller 36 and guides the sheet S to the first conveyance path 25 by the flapper 30 (30A). The conveyor 3 then conveys the sheet S guided to the first conveyance path 25, by the second conveyance roller 37 and the first switchback roller 38, and discharges the sheet S onto the discharge tray 22.

To convey the sheet S out of the main body housing 2 with the rear cover 12 open, the conveyor 3 conveys the sheet S from the process unit 4 by the first conveyance roller 36, guides the sheet S rearward by the flapper 30 (30B) swung to a position indicated by an imaginary line, and then discharges the sheet S onto the rear cover 12 in the open state through the rear opening 2B. The printer 1 is enabled to perform image formation on the sheet S even when the rear cover 12 is open. The rear cover 12 is configured to allow, in the open state, the sheet S with an image formed thereon to be discharged through the rear opening 2B.

To re-convey the sheet S to the process unit 4, the conveyor 3 conveys the sheet S conveyed from the process unit 4, by the first conveyance roller 36, and guides the sheet S to the first conveyance path 25 or the second conveyance path 26 by the flapper 30. When the sheet S has been guided to the first conveyance path 25, the conveyor 3 conveys the sheet S in the first conveyance path 25 to the third conveyance path 27 by the second conveyance roller 37 and the first switchback roller 38. When the sheet S has been guided to the second conveyance path 26, the conveyor 3 conveys the sheet S in the second conveyance path 26 to the third conveyance path 27 by the second switchback roller 39.

The sheet S conveyed to the third conveyance path 27 is fed to the process unit 4 again by the third conveyance roller 40 and the registration roller 35. The sheet S is then discharged onto the discharge tray 22 by the conveyor 3 after an image is formed on the sheet S by the process unit 4.

The conveyor 3 further includes a separation pad 42 and a pickup feed roller 43 for separating and feeding sheets S manually inserted from the multipurpose tray 14. Specifically, the separation pad 42 and pickup feed roller 43 are configured to separate the sheets S inserted from the multipurpose tray 14 on a sheet-by-sheet basis and to feed the separated sheets S to the process unit 4. The subsequent procedure is the same as in the aforementioned case where the sheets S are conveyed from the feed tray 13.

The process unit 4 is configured to transfer toner images onto the sheet S, thereby forming an image on the sheet S. The process unit 4 includes an exposure device 5, a drum unit 6, four developing cartridges 7Y, 7M, 7C, and 7K, and a transfer unit 8.

The exposure device 5 is disposed at an upper portion in the main body housing 2. The exposure device 5 includes a light source, a polygon mirror, a lens, and a reflector, which are not shown in any drawings. The exposure device 5 is configured to expose a surface of each photoconductive drum 61 by emitting a light beam, indicated by an alternate long and short dash line, onto the surface of each photoconductive drum 61.

The drum unit 6 is disposed between the feed tray 13 and the exposure device 5 in the main body housing 2. The drum unit 6 includes the four photoconductive drums 61, four electrostatic chargers 62, a pinch roller 64, and a support frame 65 that supports the photoconductive drums 61 and other elements. The drum unit 6 is configured to be removably attached to the main body housing 2 through the front opening 2A with the front cover 11 open. The pinch roller 64 is disposed to face the registration roller 35. The pinch roller 64 is configured to rotate in accordance with the rotation of the registration roller 35 and to convey the sheet S in cooperation with the registration roller 35.

The developing cartridges 7Y, 7M, 7C, and 7K correspond to four colors of yellow (Y), magenta (M), cyan (C), and black (K), respectively. The developing cartridges 7Y, 7M, 7C, and 7K are detachably mounted on the drum unit 6 in this order from the front to the rear of the printer 1. Each of the developing cartridges 7Y, 7M, 7C, and 7K has a developing roller 71, a supply roller 72, and a toner container 73. The developing cartridges 7Y, 7M, 7C, and 7K are for different toner colors, respectively, but otherwise have substantially the same configuration. Therefore, one of the developing cartridges 7Y, 7M, 7C, and 7K may be hereinafter referred to as the "developing cartridge 7" as a representative developing cartridge.

The transfer unit 8 is disposed between the feed tray 13 and the drum unit 6 in the main body housing 2. The transfer unit 8 includes a driving roller 81, a driven roller 82, a conveyor belt 83, and four transfer rollers 84. The conveyor belt 83 is wound around the driving roller 81 and the driven roller 82. An upward-facing side of the conveyor belt 83 is in contact with the photoconductive drums 61. The four transfer rollers 84 are disposed within a region surrounded by the conveyor belt 83 to sandwich the conveyor belt 83 between the transfer rollers 84 and the corresponding photoconductive drums 61.

The fuser 9 is disposed behind (i.e., disposed rearward of) the process unit 4 in the main body housing 2 when attached to the printer 1. More specifically, the fuser 9 is disposed between the rear cover 12 in the closed state and the process unit 4. The fuser 9 includes a heating roller 91 configured to heat the sheet S, and a pressure roller 92 configured to nip the sheet S between the pressure roller 92 and the heating roller 91. In the first illustrative embodiment, the heating roller 91 includes therein a heater 93 configured to heat the heating roller 91. As will be described later, the fuser 9 further includes a pressure contact/separation mechanism configured to switch between a pressure contact state in which the heating roller 91 is in pressure contact with the pressure roller 92 and a separation state in which the heating roller 91 is separated from the pressure roller 92. A detailed internal configuration of the fuser 9 will be described later.

The process unit 4 is configured to uniformly charge the surfaces of the photoconductive drums 61 by the respective chargers 62 and to expose the surfaces of the photoconductive drums 61 by the exposure device 5, thereby forming an electrostatic latent image on the surface of each photoconductive drum 61. In this case, the process unit 4 supplies toner in the toner containers 73 to the respective supply rollers 72 and supplies the toner from the supply rollers 72 to the respective developing rollers 71. The toner supplied to the developing rollers 71 is carried on the developing rollers 71 as the developing rollers 71 rotate.

The process unit 4 supplies the toner carried on the developing rollers 71 to the electrostatic latent images formed on the respective photoconductive drums 61, thereby forming a toner image on the surface of each photoconductive drum 61. The process unit 4 then transfers the toner images on the photoconductive drums 61 onto the sheet S while conveying the sheet S, fed from the feed tray 13 by the conveyor 3, between the photoconductive drums 61 and the conveyor belt 83. Thereafter, the process unit 4 conveys the sheet S to the fuser 9.

The fuser 9 fixes the toner images transferred onto the sheet S while conveying the sheet S between the heating roller 91 and the pressure roller 92, thereby forming an image on the sheet S.

In addition, the fuser 9 has a discharge sensor SE5 disposed at a downstream portion thereof in the conveyance direction. The discharge sensor SE5 is configured to detect whether the sheet S with the toner images fixed thereon by the fuser 9 has passed between the heating roller 91 and the pressure roller 92.

The printer 1 further includes a fixing fan 63 in the main body housing 2. The fixing fan 63 is configured to, when driven, exhaust air in the main body housing 2 out of the main body housing 2.

Figure 2:
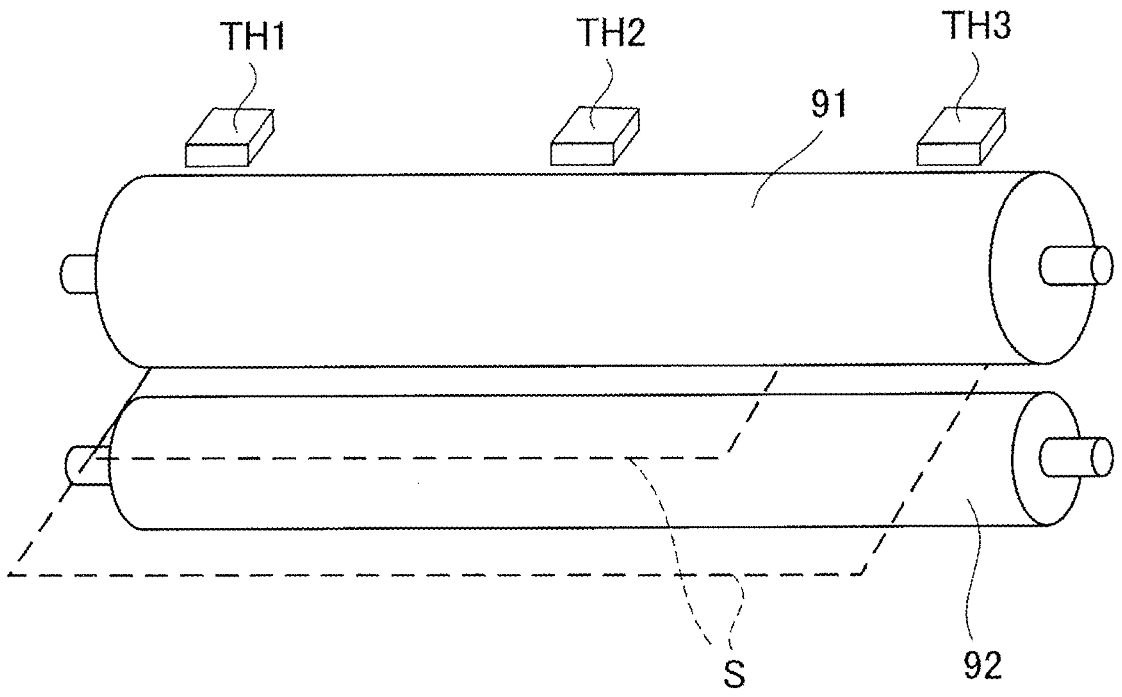
FIG. 2 illustrates fixing temperature sensors to detect temperatures of a heating roller of a fuser.

On the other hand, the fuser 9 includes three fixing temperature sensors TH1 to TH3 for detecting temperatures of the fuser 9 (more specifically, of the heating roller 91). Each of the fixing temperature sensors TH1 to TH3 includes a variable resistor whose resistance value changes depending on a temperature to be detected. Each of the fixing temperature sensors TH1 to TH3 is configured to output a signal according to the detected temperature. As shown in FIG. 2, each of the fixing temperature sensors TH1 to TH3 is disposed to face the heating roller 91 in a non-contact state. The fixing temperature sensors TH1 to TH3 have respective different detection target regions. Specifically, the fixing temperature sensor TH2 is configured to detect a temperature of a region around a center of the heating roller 91 in an axial direction (i.e., the left-right direction) of the heating roller 91. The fixing temperature sensor TH1 is configured to detect a temperature of a region around one end of the heating roller 91 in the axial direction of the heating roller 91. The fixing temperature sensor TH3 is configured to detect a temperature of a region around the other end of the heating roller 91 in the axial direction of the heating roller 91.

As described above, the printable sizes of the sheets S in the printer 1 include other sizes as well as the specified size (e.g., A4) of the sheets S to be fed from the feed tray 13, since the multipurpose tray 14 is configured to receive manually inserted sheets S of the sizes other than the specified size. When printing is performed on a sheet S of the specified size as shown in FIG. 2, the sheet S passes between the heating roller 91 and the pressure roller 92 while covering substantially the entire width of the heating roller 91 in the axial direction of the heating roller 91. Meanwhile, when printing is performed on a sheet S of a size smaller than the specified size, the sheet S passes between the heating roller 91 and the pressure roller 92 along a path that is closer to the one end (i.e., the end close to the fixing temperature sensor TH1) than to the other end (i.e., the end close to the fixing temperature sensor TH3) of the heating roller 91 in the axial direction of the heating roller 91. Namely, when printing is performed on a sheet S of a size smaller than the specified size, the fixing temperature sensor TH3 is a sensor (hereinafter may referred to as a "non-passing region temperature sensor") for detecting a temperature of a region of the heating roller 91 over which the sheet S does not pass. On the other hand, even when printing is performed on a sheet S of a size smaller than the specified size, the fixing temperature sensors TH1 and TH2 are sensors (hereinafter, which may be referred to as "passing region temperature sensors") for detecting temperatures of regions over which the sheet S passes. It is noted that when printing is performed on a sheet S of the specified size, all of the fixing temperature sensors TH1 to TH3 are sensors (i.e., passing region temperature sensors) for detecting temperatures of regions over which the sheet S passes.

In the first illustrative embodiment, the three fixing temperature sensors TH1 to TH3 are provided to detect the temperatures of the heating roller 91. However, the number of the fixing temperature sensors may not necessarily be three, and may be two or four or more. In the first illustrative embodiment, the number of the fixing temperature sensors TH1 to TH3 is three, which is more than the number of fixing temperature sensors in the known configurations. However, as will be described below, a signal from a nip detection sensor configured to detect a positional relationship between the heating roller 91 and the pressure roller 92 and the signal from the fixing temperature sensor TH3 are output to the side of the main body housing 2 via a common terminal. Therefore, it is possible to reduce the number of signal lines connecting the fuser 9 and the main body housing 2.

Figure 3:
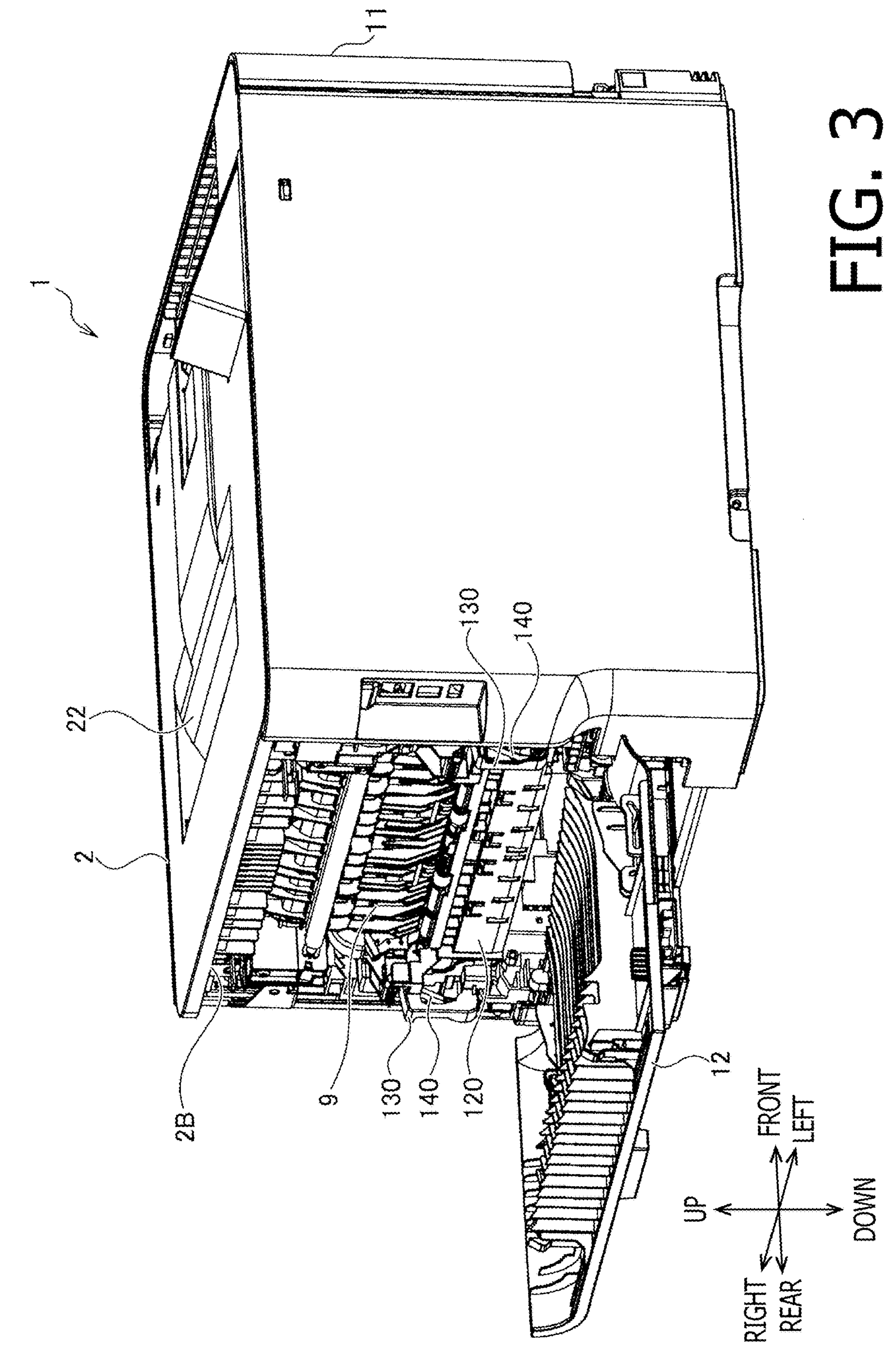
FIG. 3 is a perspective view of the printer with a rear cover open.

The fuser 9 is configured to be attached to and detached from the main body housing 2 through the rear opening 2B of the main body housing 2 that is opened when the rear cover 12 is opened. FIG. 3 shows the rear cover 12 opened. As shown in FIG. 3, the fuser 9 includes a fuser housing 120, fixed handles 130, and levers 140. The fixed handles 130 are disposed at both a left end portion and a right end portion of the fuser housing 120. Each fixed handle 130 has a corresponding lever 140 attached thereto.

Figure 4:
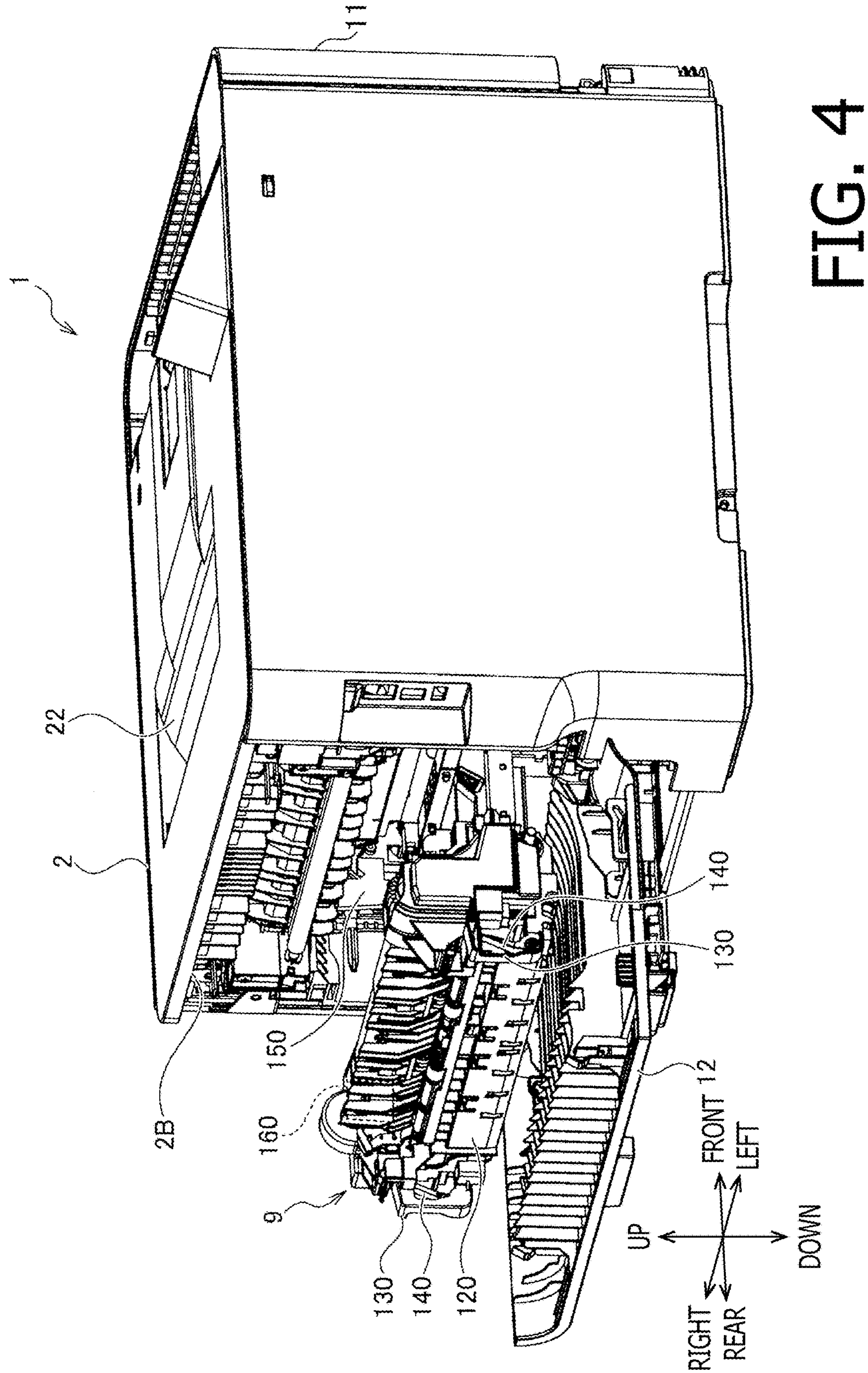
FIG. 4 is a perspective view of the printer from which the fuser is removed.

The user may detach the fuser 9 from the main body housing 2 as shown in FIG. 4 by pulling the fixed handles 130 backward while grasping the levers 140. At this time, a fuser connector 160 provided on the fuser 9 is also detached from a main body connector 150 provided on the main body housing 2. Namely, the fuser connector 160 and the main body connector 150 are connected to each other when the fuser 9 is attached to the main body housing 2, and are disconnected from each other when the fuser 9 is detached from the main body housing 2.

Although not shown in any drawings, the main body housing 2 includes a fuser detection switch 15 (see FIG. 8) disposed at a position where the main body housing 2 is in contact with the fuser 9 when the fuser 9 is attached to the main body housing 2. The fuser detection switch 15 is for detecting whether the fuser 9 is attached to the main body housing 2. Specifically, the fuser detection switch 15 is configured to be turned on when the fuser 9 is attached to the main body housing 2 and to be turned off when the fuser 9 is detached from the main body housing 2.

Configuration of Fuser

Figure 5:
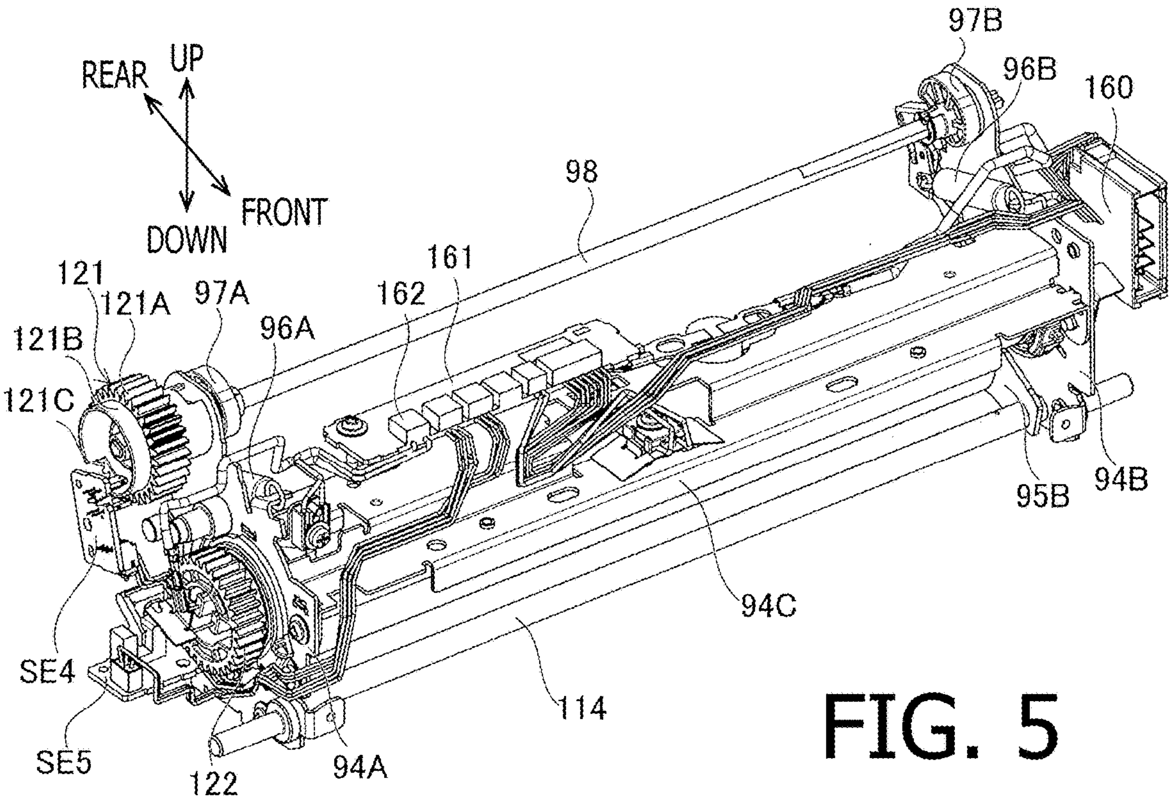
FIG. 5 shows an internal configuration of the fuser as viewed from the front.
Figure 6:
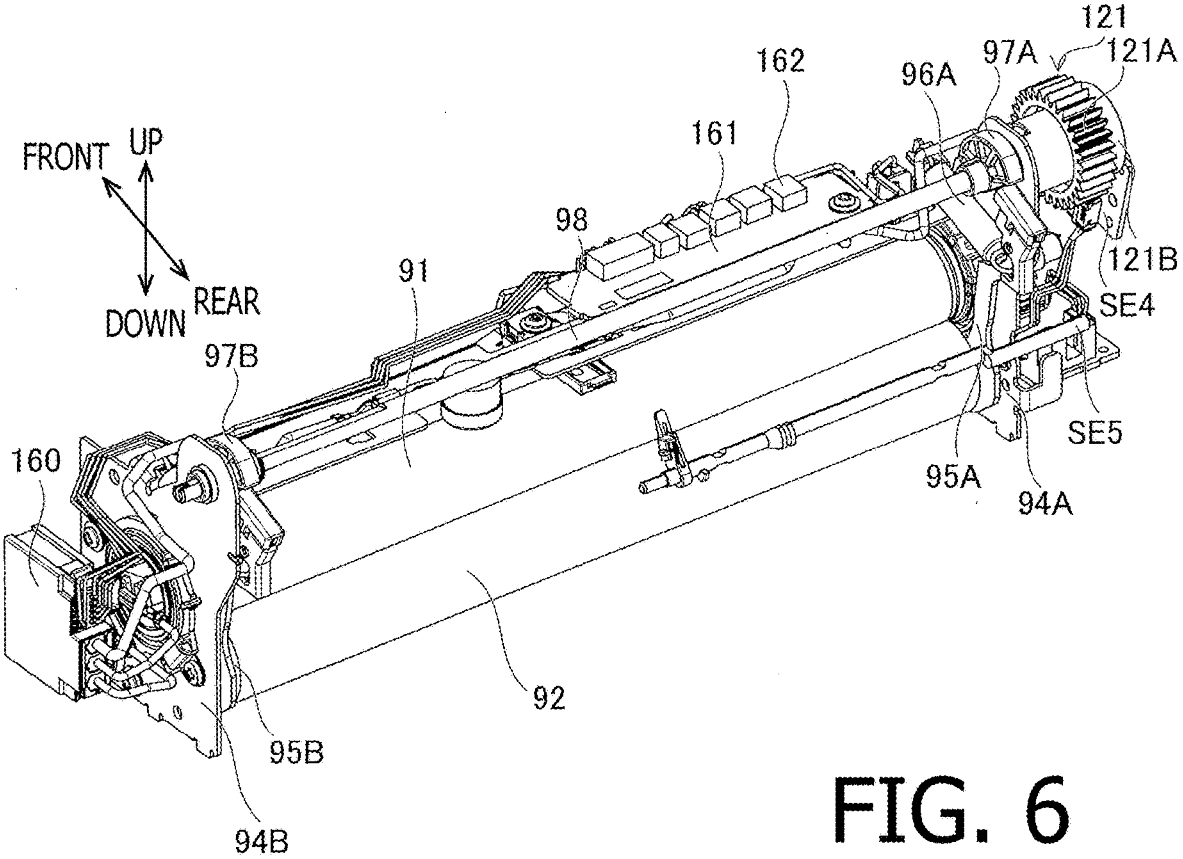
FIG. 6 shows the internal configuration of the fuser as viewed from the rear.

Next, among the aforementioned elements included in the printer 1, in particular, the fuser 9 configured to be detachably attached to the main body housing 2 and to fix toner images on a sheet S will be described in detail with reference to the relevant drawings. FIGS. 5 and 6 show internal configurations of the fuser 9 with an outer wall of the fuser housing 120 removed therefrom as viewed from the front and the rear, respectively. In the following description, the front-rear direction and the vertical direction are defined as indicated in the relevant drawings.

The fuser 9 includes the heating roller (hereinafter, which may be referred to as a "heating rotatable body") 91 as an example of a heating member configured to heat a sheet S. The fuser 9 further includes the pressure roller (hereinafter, which may be referred to as a "pressure rotatable body") 92 configured to nip the sheet S between the pressure roller 92 and the heating roller 91. The fuser 9 further includes side frames 94A and 94B, a connection frame 94C, arms 95A and 95B, springs 96A and 96B, and cams 97A and 97B.

The heating roller 91 extends in a longitudinal direction, and is rotatable around a rotation axis. The heating roller 91 is configured to rotate in response to receiving a driving force from the main motor 201A provided on the printer 1. The heating roller 91 includes a metal tube and the heater 93 disposed inside the metal tube. Thus, the heating roller 91 is further configured to be heated by the heater 93. For instance, the heater 93 is a halogen heater.

In the following description, the longitudinal direction of the heating roller 91 may be simply referred to as the "longitudinal direction." The longitudinal direction is also the axial direction in which the rotation axis of the heating roller 91 extends. Therefore, the longitudinal direction may also be referred to as the axial direction. The sheet S is conveyed from the front to the rear of the fuser 9 and passes through the fuser 9. The sheet S, after passing through the fuser 9, is conveyed along the first conveyance path 25 toward a position above the fuser 9, as shown in FIG. 1.

The pressure roller 92 is configured to rotate in accordance with the rotation of the heating roller 91 and to nip the sheet S between the pressure roller 92 and the heating roller 91. For instance, the pressure roller 92 is made of an elastic material such as rubber.

The side frames 94A and 94B are disposed close to one end and the other end of the heating roller 91 in the longitudinal direction, respectively. Further, the side frames 94A and 94B are disposed close to one end and the other end of the pressure roller 92 in the longitudinal direction, respectively. The heating roller 91 is rotatably supported by the side frames 94A and 94B.

The connection frame 94C is a metal plate extending in the longitudinal direction. The connection frame 94C connects the side frame 94A on one side (hereinafter, which may be referred to as the "first side") in the longitudinal direction with the side frame 94B on the other side (hereinafter, which may be referred to as the "second side") in the longitudinal direction. It is noted that the first side and the second side in the longitudinal direction correspond substantially to the left and the right in the left-right direction, respectively.

The cam 97A is disposed close to the side frame 94A and is supported to be rotatable relative to the side frame 94A. The cam 97B is disposed close to the side frame 94B and is supported to be rotatable relative to the side frame 94B. The cam 97A and the cam 97B are connected to each other by a cam shaft 98.

The arms 95A and 95B, the springs 96A and 96B, and the cams 97A and 97B are included in the pressure contact/separation mechanism configured to switch between the pressure contact state in which the heating roller 91 and the pressure roller 92 are in pressure contact with each other to nip the sheet S therebetween and the separation state in which the heating roller 91 and the pressure roller 92 are separated from each other. More specifically, the pressure contact/separation mechanism is configured to move at least one of the heating roller 91 and the pressure roller 92 with respect to the other, thereby switching between the pressure contact state (in which even a nip pressure between the heating roller 91 and the pressure roller 92 is adjustable) and the separation state. In particular, in the first illustrative embodiment, the pressure contact/separation mechanism is configured to switch between the pressure contact state and the separation state by moving the pressure roller 92 with respect to the heating roller 91.

The pressure contact/separation mechanism is described below with reference to FIG. 7. The operations of the arm 95A, the spring 96A, and the cam 97A in the side frame 94A are substantially the same as the operations of the arm 95B, the spring 96B, and the cam 97B in the side frame 94B. Therefore, the following describes the operations of the arm 95A, the spring 96A, and the cam 97A in the side frame 94A with examples.

Figure 7:
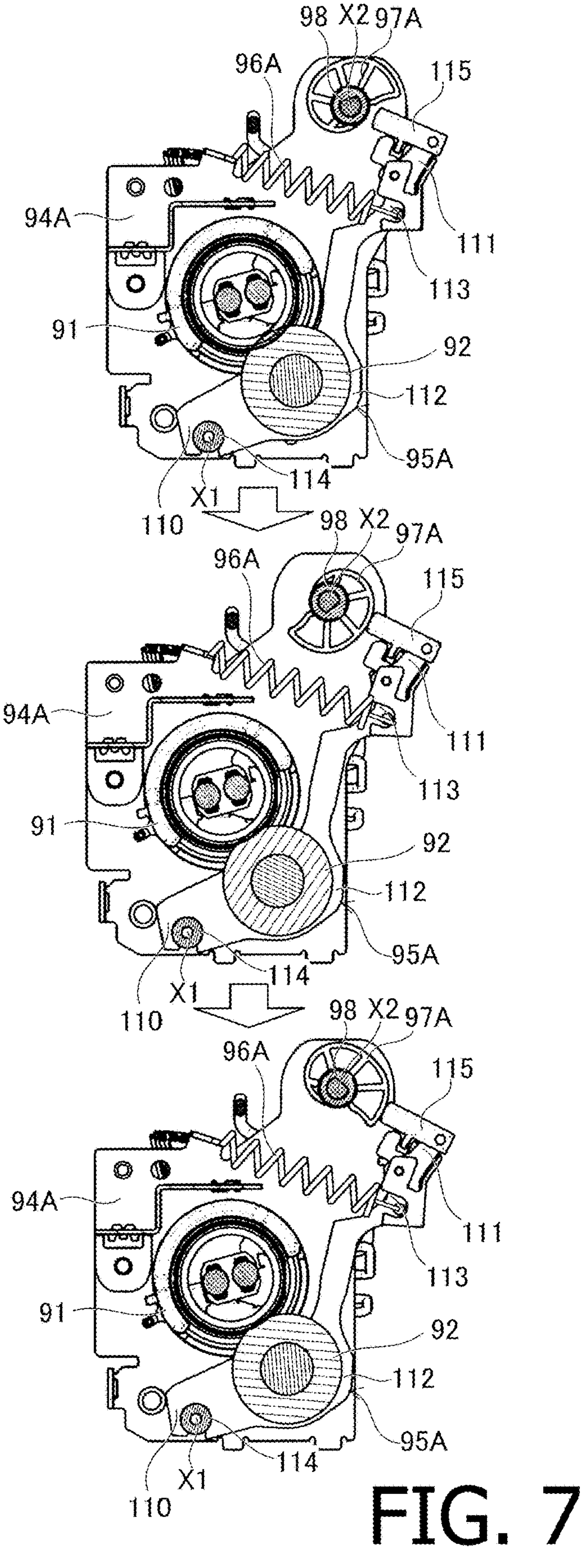
FIG. 7 illustrates a pressure contact/separation mechanism of the fuser.

As shown in FIG. 7, the arm 95A includes a first end portion 110, a second end portion 111, a first section 112, and a second section 113. The arm 95A is supported by the side frame 94A through a shaft 114 in such a manner that the first end portion 110 is rotatable around an arm axis X1. In addition, the second end portion 111 includes a cam follower 115. The cam follower 115 is configured to contact the cam 97A.

The first section 112 and the second section 113 are disposed between the first end portion 110 and the second end portion 111. The first section 112 rotatably supports the pressure roller 92. The second section 113 is a section to which the spring 96A is connected. One end of the spring 96A is hooked to the second section 113. The other end of the spring 96A is hooked to the side frame 94A. The spring 96A is configured to urge the pressure roller 92 toward the heating roller 91 through the arm 95A.

The cam 97A is supported by the side frame 94A on the first side in the longitudinal direction through the cam shaft 98 so as to be rotatable around a cam axis X2. The cam 97A has an irregular semicircular shape as shown in FIG. 7. The cam 97A is configured to rotate and come into contact with the cam follower 115, thereby rotating the arm 95A around the arm axis X1. The cam 97A is further configured to move the pressure roller 92 relative to the heating roller 91 in accordance with the rotation of the arm 95A, thereby switching between the pressure contact state and the separation state. The cam 97A is rotatable in a counterclockwise direction as shown in FIG. 7.

An upper drawing in FIG. 7 shows the pressure contact state in which the heating roller 91 and the pressure roller 92 are in pressure contact with each other. A lower drawing in FIG. 7 shows the separation state in which the heating roller 91 and the pressure roller 92 are separated from each other. A middle drawing in FIG. 7 shows a state in transition from the pressure contact state to the separation state.

Next, referring back to FIGS. 5 and 6 to continue the explanation of the fuser 9, the fuser 9 further includes a cam gear 121 and a fixing gear 122. The cam gear 121 is fixed to a first-side end portion of the cam shaft 98 in the longitudinal direction (i.e., the cam gear 121 is fixed substantially to the left end portion of the cam shaft 98 in the left-right direction). The cam gear 121 is connected to the cam 97A and the cam 97B through the cam shaft 98. The cam gear 121 is configured to transmit a driving force to the cam 97A and the cam 97B. The cam gear 121 includes a plurality of gear teeth 121A and a flange 121B. The flange 121B extends from near a base of the gear teeth 121A to the first side in the longitudinal direction (i.e., the flange 121B extends from near the base of the gear teeth 121A substantially to the left in the left-right direction). The flange 121B has a notch 121C for detecting a phase of the cam 97A.

The fixing gear 122 includes a plurality of gear teeth. The fixing gear 122 is fixed to a first-side end portion of the heating roller 91 in the longitudinal direction. The fixing gear 122 is disposed coaxially with the heating roller 91. The fixing gear 122 is configured to rotate around the rotation axis integrally with the heating roller 91 and to transmit a driving force to the heating roller 91.

In addition to the aforementioned fixing temperature sensors TH1 to TH3 (see FIG. 2) configured to detect the temperatures of the heating roller 91, the fuser 9 further includes a nip detection sensor SE4, the discharge sensor SE5, the fuser connector 160, and a relay board 161.

The nip detection sensor SE4 is configured to detect a phase of the cam 97A. More specifically, the nip detection sensor SE4 is an optical sensor that includes a light-emitting section configured to emit light, and a light-receiving section configured to receive the light from the light-emitting section. The light-emitting section includes a light-emitting diode described below. The light-receiving section includes a phototransistor Tr (see FIG. 10). In the pressure contact state in which the heating roller 91 and the pressure roller 92 are in pressure contact with each other as shown in the upper drawing of FIG. 7, the light from the light-emitting section is blocked by the gear (specifically, the flange 121B of the cam gear 121) included in the pressure contact/separation mechanism. On the other hand, in the separated state in which the heating roller 91 and the pressure roller 92 are separated from each other as shown in the lower drawing of FIG. 7, the light from the light-emitting section is not blocked, and the light-receiving section is allowed to receive the light that has passed through the notch 121C formed in the flange 121B of the cam gear 121. As a result, as will be described later, the controller of the printer 1 is enabled to determine that the pressure contact/separation mechanism is in the separation state when the phototransistor Tr in the light-receiving section receives the light, and to determine that the pressure contact/separation mechanism is in the pressure contact state when the phototransistor Tr in the light-receiving section does not receive the light.

However, it is also possible to reverse the relationship between the light-blocking state detected by the nip detection sensor SE4 and the state of the pressure contact/separation mechanism by adjusting the position of the notch 121C in the flange 121B. Namely, the nip detection sensor SE4 may be configured to allow the light-receiving section to receive the light that has been emitted by the light-emitting section and passed through the notch 121C in the pressure contact state in which the heating roller 91 and the pressure roller 92 are in pressure contact with each other as shown in the upper drawing of FIG. 7. In this case, the nip detection sensor SE4 may be further configured to block the light from the light-emitting section in the separation state in which the heating roller 91 and the pressure roller 92 are separated from each other as shown in the lower drawing of FIG. 7. Thus, in this case, the controller of the printer 1 may be configured to determine that the pressure contact/separation mechanism is in the pressure contact state when the phototransistor Tr in the light-receiving section receives the light, and to determine that the pressure contact/separation mechanism is in the separation state when the phototransistor Tr in the light-receiving section does not receive the light.

The discharge sensor SE5 is configured to detect a sheet S that has passed between the heating roller 91 and the pressure roller 92, i.e., to detect a sheet S on which developer images have been fixed by the fuser 9. The discharge sensor SE5 includes an actuator configured to rotate around a rotation axis, and a photo sensor. When the sheet S, after passing between the heating roller 91 and the pressure roller 92, has come into contact with the actuator and has pushed the actuator down, the photo sensor near the rotation axis of the actuator detects that the actuator has been pushed down, i.e., that the sheet S has been discharged with the developer images fixed thereon by the fuser 9.

On the other hand, the fuser connector 160 is configured to be connected to the main body connector 150 (see FIG. 4) provided on the main body housing 2 of the printer 1 when the fuser 9 is attached to the main body housing 2. The fuser connector 160 is disposed outside the side frame 94B in the longitudinal direction.

The relay board 161 is configured to relay (i.e., transmit) the signals from the fixing temperature sensors TH1 to TH3, the nip detection sensor SE4, and the discharge sensor SE5 to the fuser connector 160. The relay board 161 includes a plurality of connectors (terminals) 162, each of which is configured to be connected to a corresponding sensor via a cable. The relay board 161 further includes another connector 162 configured to be connected to the fuser connector 160 via a cable. In the first illustrative embodiment, the relay board 161 basically includes the connectors 162, each of which is individually provided for a corresponding sensor. However, in order to reduce the number of terminals on the fuser connector 160 and the main body connector 150, the relay board 161 is configured to output the signals from the fixing temperature sensor TH3 and the nip detection sensor SE4 to the fuser connector 160 through a single common signal line. Details of this will be described later.

In addition, the heater 93 of the heating roller 91 is connected to the fuser connector 160 by a power cable. Specifically, the heater 93 is connected to the fuser connector 160 by the power cable via a thermostat TM. The thermostat TM is configured to cut off the power supply when a temperature of the heating roller 91 exceeds a controllable range and becomes overheated.

When the fuser 9 having the above configuration is attached to the main body housing 2 of the printer 1, the fuser connector 160 is connected to the main body connector 150. When the fuser connector 160 and the main body connector 150 are connected to each other, the fuser 9 is enabled to transmit the temperature information detected by the fixing temperature sensors TH1 to TH3, the state of the pressure contact/separation mechanism detected by the nip detection sensor SE4, and the sheet information detected by the discharge sensor SE5 to the controller of the printer 1. In addition, when the fuser connector 160 and the main body connector 150 are connected to each other, the printer 1 is enabled to supply electric power to the heater 93 from a power supply board of the main body housing 2. The power supply board is controlled by the controller, and is configured to supply power to the heater 93 based on the temperature information detected by the fixing temperature sensors TH1 to TH3.

Electrical Configuration of Printer

Next, an electrical configuration of the printer 1 including the fuser 9 is described with reference to FIG. 8. FIG. 8 shows an electrical configuration of the printer 1 including the fuser 9. In FIG. 8, major components necessary to explain the first illustrative embodiment are shown, while the other components of the printer 1 may not be shown.

As shown in FIG. 8, the main body housing 2 includes a main board (i.e., a control board) 200, a main motor board 201, a high-voltage power supply board 202, and a low-voltage power supply board 203. The above boards are connected to each other via harnesses. The main motor 201A is mounted on the main motor board 201. When the main motor 201A is driven, the heating roller 91 of the fuser 9 and the rollers included in the conveyor 3 rotate.

The high-voltage power supply board 202 is configured to supply high voltages HV such as a developing voltage and a charging voltage to the process unit 4. The high-voltage power supply board 202 includes a high-voltage generation circuit 202C. The high-voltage generation circuit 202C is configured to generate the high voltages HV (e.g., voltages of around 1 kV) based on a DC voltage (e.g., 24 VDC) supplied from the low-voltage power supply board 203 via the main board 200, and to supply the generated high voltages HV to the process unit 4.

The main board 200 and the high-voltage power supply board 202 are connected to each other through a first connecting line CA1. An ASIC ("ASIC" is an abbreviation for "Application Specific Integrated Circuit") 210 mounted on the main board 200 needs to send and receive control signals between the main board 200 and the high-voltage power supply board 202 in order to control the high-voltage power supply board 202. The first connecting line CA1 is used to transmit these control signals. In order to transmit a plurality of control signals, the first connecting line CA1 includes a plurality of signal lines. Therefore, the first connecting line CA1 is formed by a harness in which the plurality of signal lines are bundled.

The low-voltage power supply board 203 includes an AC-DC conversion circuit 203C. The low-voltage power supply board 203 is configured to receive an input of an AC voltage (e.g., 100 VAC) supplied from a commercial power supply, and to convert the received 100 VAC to a DC voltage (e.g., 24 VDC) using the AC-DC conversion circuit 203C. The low-voltage power supply board 203 is connected to the main board 200 via a fourth connecting line CA4. Thus, the low-voltage power supply board 203 is enabled to output the generated 24 VDC to the main board 200.

The main board 200 includes a DC-DC conversion circuit 211. The main board 200 is configured to convert the 24 VDC received from the low-voltage power supply board 203 to, for instance, 3.3 VDC using the DC-DC conversion circuit 211. The 3.3 VDC is a voltage used to drive various electronic components mounted on the main board 200. However, if there are electronic components configured to be driven by other DC voltages (e.g., 5 VDC), the main board 200 may include a plurality of DC-DC conversion circuits, and may be configured to generate the other DC voltages such as 5 VDC in addition to 3.3 VDC.

The DC-DC conversion circuit 211 is configured to generate 3.3 VDC and 1.8 VDC to be input to the fuser 9, as well as the voltage(s) for driving the various electronic components mounted on the main board 200 described above. These generated voltages of 3.3 VDC and 1.8 VDC are supplied to the fuser 9 via the main body connector 150 together with the ground potential. As will be described later, the relay board 161 provided on the fuser 9 uses these supplied voltages and the ground potential to drive the fixing temperature sensors TH1 to TH3, the nip detection sensor SE4, and the discharge sensor SE5, and outputs the signals from each of the above sensors to the ASIC 210.

The low-voltage power supply board 203 is connected to the main body connector 150 via a third connecting line CA3, and is connected to an inlet 204 via a fifth connecting line CA5. The inlet 204 is configured to receive an input of the AC voltage (e.g., 100 VAC) supplied from the commercial power supply. The AC voltage is supplied from the inlet 204 to the fuser 9 via the fifth connecting line CA5, the low-voltage power supply board 203, the third connecting line CA3, the main body connector 150, and the fuser connector 160. The voltage supplied to the fuser 9 is supplied to the heater 93 via the thermostat TM.

The ASIC 210 mounted on the main board 200 includes, for instance, a CPU, a memory, and an input/output circuit (none of which are shown in any drawings). The ASIC 210 is configured to perform various types of arithmetic processing based on programs and data stored in the memory, thereby performing overall control of the printer 1 including the process unit 4. The memory is an embedded memory. The memory may be configured with a combination of a plurality of storage devices such as a ROM, a RAM, an NVRAM, an SSD, and an HDD. The memory is used when the ASIC 210 executes various programs.

In addition to the ASIC 210, the main board 200 further includes a motor drive circuit MD, an ON/OFF circuit 212, a detection circuit (DET) 213, and the aforementioned DC-DC conversion circuit 211. The motor drive circuit MD is for driving the main motor 201A. The ON/OFF circuit 212 is configured to control whether to supply 24 VDC to the high-voltage generation circuit 202C of the high-voltage power supply board 202. The detection circuit (DET) 213 is configured to detect whether the fuser detection switch 15 for detecting whether the fuser 9 is attached to the main body housing 2 is in an ON state or in an OFF state.

The AC-DC conversion circuit 203C of the low-voltage power supply board 203 is connected to the DC-DC conversion circuit 211 via a power line PL. The power line PL connecting the AC-DC conversion circuit 203C and the DC-DC conversion circuit 211 to each other is included in the fourth connection line CA4 described above. The power line PL branches at a branching point BPO on the main board 200, and a branch of the power line PL extends to connect to an input side of the fuser detection switch 15.

An output side of the fuser detection switch 15 is connected to an input side of the ON/OFF circuit 212 via the power line PL. The power line PL extending from the output side of the fuser detection switch 15 branches at a first branching point BP1 located between the output side of the fuser detection switch 15 and the input side of the ON/OFF circuit 212, and a branch of the power line PL is connected to an input side of the motor drive circuit MD. Further, the power line PL extending from the output side of the fuser detection switch 15 to the input side of the ON/OFF circuit 212 branches at a second branching point BP2 located downstream of the first branching point BP1 in the extending direction of the power line PL, and a branch of the power line PL is connected to an input side of the detection circuit 213.

An output side of the motor drive circuit MD is connected to the main motor 201A. The motor drive circuit MD is supplied with the voltage applied to the first branch point BP1 on the power line PL. The output voltage from the fuser detection switch 15 is applied to the first branch point BP1. Therefore, when the fuser detection switch 15 is in the ON state, 24 VDC is applied to the first branch point BP1. Meanwhile, when the fuser detection switch 15 is in the OFF state, 0 V is applied to the first branch point BP1.

In addition, the motor drive circuit MD is configured to receive an input of a signal EN from an output port of the ASIC 210. The signal EN is a signal for enabling or disabling the motor drive circuit MD. For instance, when the value of the signal EN is H, the motor drive circuit MD is in an operable state. Meanwhile, when the value of the signal EN is L, the motor drive circuit MD is in an inoperable state. However, even if the signal EN of the value His input to the motor drive circuit MD, the motor drive circuit MD does not operate as long as 24 VDC is not applied to the motor drive circuit MD. Specifically, when the signal EN of the value H is input to the motor drive circuit MD with 24 VDC applied, the motor drive circuit MD starts operating. Meanwhile, when the signal EN of the value Lis input to the motor drive circuit MD with 24 VDC applied, the motor drive circuit MD stops operating. If 0 V is applied to the motor drive circuit MD, the motor drive circuit MD stops operating regardless of the value of the EN signal. Practicable examples of the method for the motor drive circuit MD to control the main motor 201A may include known methods. Therefore, an explanation of the method for the motor drive circuit MD to control the main motor 201A is omitted.

In addition, an output side of the ON/OFF circuit 212 is connected to an input side of the power supply voltage for the high-voltage generation circuit 202C of the high-voltage power supply board 202. The high-voltage generation circuit 202C is further configured to receive an input of a control signal from an output port (not shown) of the ASIC 210. For instance, the high-voltage generation circuit 202C includes a step-up circuit including a transformer, and a transformer drive circuit. As described above, the high-voltage generation circuit 202C is enabled to boost the input 24 VDC based on the input control signal and to supply the generated high voltages HV (specifically, including a charging voltage, a developing voltage, and a transfer voltage) to the process unit 4.

The ASIC 210 outputs an HVEN signal to the ON/OFF circuit 212. The HVEN signal is a signal for controlling the ON/OFF circuit 212. The HVEN signal takes one of the values ON (=H) and OFF (=L). While receiving an input of 24 VDC from the fuser detection switch 15, the ON/OFF circuit 212 switches whether or not to input 24 VDC to the high-voltage generation circuit 202C according to the value of the HVEN signal output from the ASIC 210.

An output side of the detection circuit 213 is connected to an input port (not shown) of the ASIC 210. When a value of a detection signal from the detection circuit 213 is L, the ASIC 210 determines that the fuser detection switch 15 is in the ON state. Meanwhile, when the value of the detection signal from the detection circuit 213 is H, the ASIC 210 determines that the fuser detection switch 15 is in the OFF state.

In addition, the input port of the ASIC 210 is connected to an output side of a rear cover open/close detection switch 16 for detecting whether the rear cover 12 is open or closed. The rear cover open/close detection switch 16 is disposed near the rear cover 12. The rear cover open/close detection switch 16 is configured to output a rear cover open/close signal indicating a value depending on whether the rear cover 12 is open or closed. The ASIC 210 is enabled to determine whether the rear cover 12 is open or closed based on the value of the rear cover open/close signal.

The main board 200 is connected to the high-voltage power supply board 202 via a connector 200A provided on the main board 200, the first connecting line CA1, and a connector 202A provided on the high-voltage power supply board 202. The high-voltage power supply board 202 is connected to the main body connector 150 via a connector 202B provided on the high-voltage power supply board 202 and the second connecting line CA2.

As described above, the main body housing 2 includes the inlet 204. The AC voltage supplied from the inlet 204 is input to the low-voltage power supply board 203 via a connector 203A provided on the low-voltage power supply board 203. The low-voltage power supply board 203 is connected to the main body connector 150 via a connector 203B provided on the low-voltage power supply board 203 and the third connecting line CA3.

When the fuser 9 is attached to the main body housing 2 of the printer 1, the main body connector 150 is connected to the fuser connector 160. The fuser connector 160 is connected to the relay board 161 of the fuser 9 via a connector 161A provided on the relay board 161. As described above, the fuser 9 includes the heater 93. The heater 93 is supplied with the AC voltage (e.g., 100 VAC) input from the inlet 204 via the low-voltage power supply board 203, the third connecting line CA3, the main body connector 150, and the fuser connector 160.

The heater 93 is heated by the 100 VAC thus supplied. When 100 VAC is supplied to the heater 93, the ASIC 210 controls a heating temperature of the heater 93 by controlling the ON/OFF timing of the 100 VAC supplied to the heater 93. As described above, the fixing temperature sensors TH1 to TH3 are provided to control the heating temperature. The fixing temperature sensors TH1 to TH3 are three sensors as shown in FIG. 2. The fixing temperature sensors TH1 to TH3 are disposed at such positions as to detect temperatures of a left end portion, a center portion, and a right end portion of the heating roller 91 elongated in the left-right direction, respectively.

The fixing temperature sensors TH1 and TH3, which are configured to detect the temperatures of the left end portion and the right end portion of the heating roller 91, respectively, are supplied with 3.3 VDC from the relay board 161. The fixing temperature sensors TH1 and TH3 operate at this 3.3 VDC. The fixing temperature sensor TH2, which is configured to detect the temperature of the center portion of the heating roller 91, is supplied with 1.8 VDC. The fixing temperature sensor TH2 operates at this 1.8 VDC. A reason for using the fixing temperature sensors TH1 to TH3 having the different operating voltages as described above is that even if one of the voltages 3.3 VDC and 1.8 VDC is not supplied due to a power supply line being cut or the DC-DC conversion circuit 211 being broken, at least one of the fixing temperature sensors TH1 to TH3 is available to detect a temperature of the heating roller 91. Furthermore, when an operational mode of the printer 1 changes to a sleep state, the supply of ENG 3.3 V is stopped, but the supply of 1.8 VDC is maintained. Therefore, another reason for using the fixing temperature sensors TH1 to TH3 having the different operating voltages as described above is to operate the fixing temperature sensor TH2 even when the printer 1 is put into the sleep state. Details on how the fixing temperature sensors TH1 to TH3 operate on the relay board 161 will be discussed later.

When a particular period of time has elapsed during which the printer 1 has received neither an execution command for image formation nor data related to image formation since the printer 1 changed its power consumption state to a "standby state" (i.e., a non-power-saving mode), the printer 1 changes its power consumption state from the "standby state" to a "sleep state" (i.e., a power-saving mode). The "sleep state" is an operational mode in which the printer 1 consumes less power than in the "standby state." For instance, when the printer 1 is put into the "sleep state," a display of the printer 1 is turned off, clock-down is performed to reduce an operating frequency of the CPU, and as described above, the supply of 3.3 VDC is stopped. When the printer 1 has received an execution command for image formation or data related to image formation in the "sleep state," the printer 1 changes its power consumption state back to the "standby state" and performs printing.

In order for the ASIC 210 on the main board 200 to control the heating temperature of the heater 93, signals THM1 to THM3 (i.e., signals THM1 to THM3 detected in the fuser 9) respectively corresponding to the temperatures detected by the fixing temperature sensors TH1 to TH3 are transmitted from the fuser 9 to the main board 200. More specifically, the signals THM1 to THM3 are transmitted to the main board 200 via the relay board 161, the fuser connector 160, the main body connector 150, the second connecting line CA2, the high-voltage power supply board 202, and the first connecting line CA1. The ASIC 210 on the main board 200 controls the ON/OFF timing of the 100 VAC to be supplied to the heater 93, based on the signals THM1 to THM3 from the fixing temperature sensors TH1 to TH3. In addition to the signals THM1 to THM3 from the fixing temperature sensors TH1 to TH3, the detection signals from the nip detection sensor SE4 and the discharge sensor SE5 are transmitted from the fuser 9 to the main board 200.

Electrical Configuration of Relay Board

Figure 9:
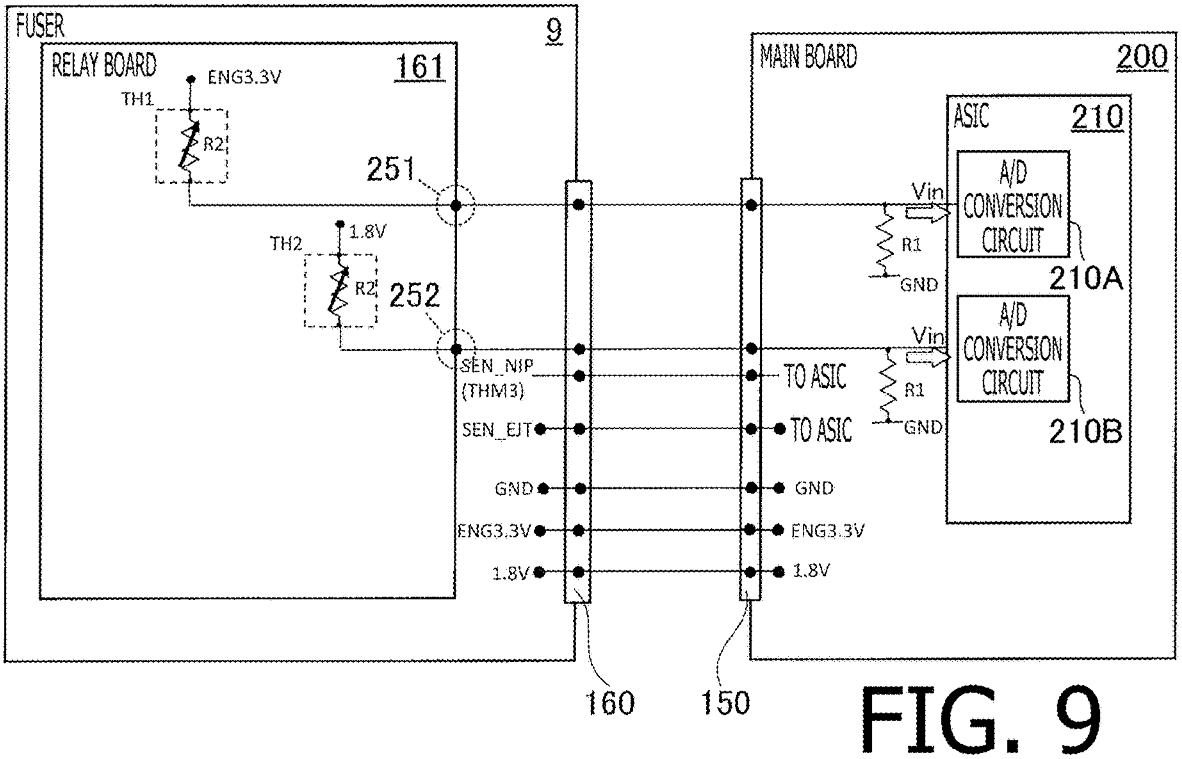
FIG. 9 shows an electrical configuration with respect to the fixing temperature sensors TH1 and TH2 of a relay board of the fuser.
Figure 10:
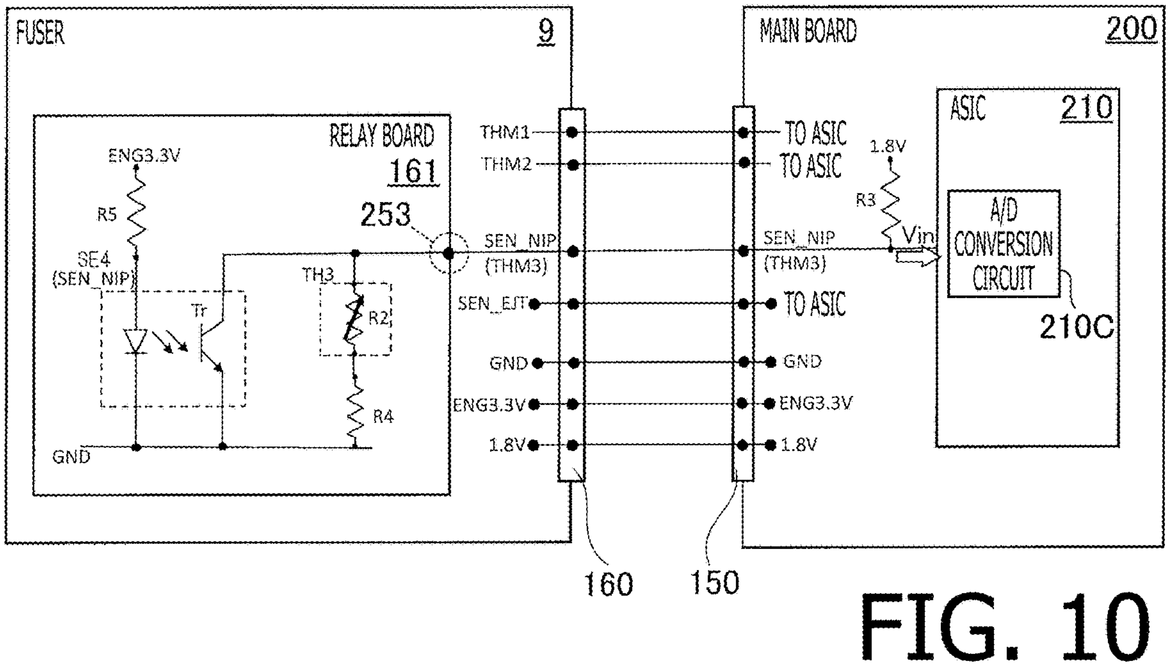
FIG. 10 shows an electrical configuration with respect to the fixing temperature sensor TH3 of the relay board of the fuser.

Next, with reference to FIGS. 9 and 10, a more detailed explanation is provided of an electrical configuration of the relay board 161 included in the fuser 9, among the aforementioned electrical configuration features of the printer 1. In particular, FIGS. 9 and 10 show only extracted features of an electrical configuration of the relay board 161 provided on the fuser 9 and a partial electrical configuration of the printer 1 associated with the relay board 161, among the electrical configuration features of the printer 1.

First, the fixing temperature sensor TH1 (i.e., the sensor configured to detect the temperature of the region around the one end of the heating roller 91 in the axial direction of the heating roller 91, see FIG. 2) of the fuser 9 is described with reference to FIG. 9. The fixing temperature sensor TH1 includes a variable resistor R2 configured to change its resistance value depending on the temperature to be detected. The variable resistor R2 of the fixing temperature sensor TH1 is connected at one end to a 3.3 VDC power supply provided on the relay board 161, and at the other end to a terminal of the fuser connector 160 via a signal line. The relay board 161 is configured to relay (i.e., transmit) the signal from the fixing temperature sensor TH1 to the main board 200 via a dedicated output terminal 251. The main board 200 includes a resistor R1 having a particular resistance value. The resistor R1 is connected at one end to a terminal of the ASIC 210, which is connected to the output terminal 251 and is configured to receive an input of the signal from the fixing temperature sensor TH1. The resistor R1 is further connected at the other end to the ground GND of the main board 200. For instance, the ground GND has a potential of 0 V. However, practicable examples of the potential of the ground GND are not limited to 0 V, but may include other potential values as long as they are usable as reference potentials. The same may apply to other grounds GND described below. The ASIC 210 includes an A/D conversion circuit 210A. Thus, according to the above electrical configuration with respect to the fixing temperature sensor TH1, an analog voltage obtained by dividing the voltage 3.3 V by the variable resistor R2 and the resistor R1 is input to the A/D conversion circuit 210A of the ASIC 210. The ASIC 210 then identifies the temperature detected by the fixing temperature sensor TH1 using a digital value obtained through conversion by the A/D conversion circuit 210A.

An analog voltage (signal) Vin expressed by the following equation (1) is input to the A/D conversion circuit 210A.

$$Vin = 3.3\ \text{V} \times R1/(\text{variable } R2 + R1) \qquad (1)$$

As shown above, the analog voltage Vin changes as the resistance value of the variable resistor R2 changes depending on the change in temperature to be detected by the fixing temperature sensor TH1. It is noted that "R1" and "variable R2" in the equation (1) represent the respective resistance values of the resistor R1 and the variable resistor R2.

Next, the fixing temperature sensor TH2 (i.e., the sensor configured to detect the temperature of the region around the center of the heating roller 91 in the axial direction of the heating roller 91, see FIG. 2) of the fuser 9 is described with reference to FIG. 9. The fixing temperature sensor TH2 includes a variable resistor R2 configured to change its resistance value depending on the temperature to be detected. The variable resistor R2 of the fixing temperature sensor TH2 is connected at one end to a 1.8 VDC power supply provided on the relay board 161, and at the other end to a terminal of the fuser connector 160 via a signal line. The relay board 161 is configured to relay (i.e., transmit) the signal from the fixing temperature sensor TH2 to the main board 200 via a dedicated output terminal 252. The main board 200 includes a resistor R1 having a particular resistance value. The resistor R1 is connected at one end to a terminal of the ASIC 210, which is connected to the output terminal 252 and is configured to receive an input of the signal from the fixing temperature sensor TH2. The resistor R1 is further connected at the other end to the ground GND of the main board 200. The ASIC 210 includes an A/D conversion circuit 210B. Thus, according to the above electrical configuration with respect to the fixing temperature sensor TH2, an analog voltage obtained by dividing the voltage 1.8 V by the variable resistor R2 and the resistor R1 is input to the A/D conversion circuit 210B of the ASIC 210. The ASIC 210 then identifies the temperature detected by the fixing temperature sensor TH2 using a digital value obtained through conversion by the A/D conversion circuit 210B.

An analog voltage (signal) Vin expressed by the following equation (2) is input to the A/D conversion circuit 210B.

$$Vin = 1.8\ \text{V} \times R1/(\text{variable } R2 + R1) \qquad (2)$$

As shown above, the analog voltage Vin changes as the resistance value of the variable resistor R2 changes depending on the change in temperature to be detected by the fixing temperature sensor TH2. It is noted that "R1" and "variable R2" in the equation (2) represent the respective resistance values of the resistor R1 and the variable resistor R2.

As described above, each of the fixing temperature sensors TH1 and TH2 is connected to the main board 200 with the corresponding resistor R1 provided thereon connected to the ground GND. Therefore, the corresponding analog voltage Vin indicates a potential value with the ground GND of not the relay board 161 but the main board 200 as a reference potential. This makes it possible to inhibit the ground deviation when analog-to-digital conversion is performed by each of the AD conversion circuits 210A and 210B, and to detect temperatures more accurately.

The voltages of 3.3 VDC and 1.8 VDC from the power supplies provided on the relay board 161 are generated by the DC-DC conversion circuit 211 of the main board 200, and are supplied to the fuser 9 via the main body connector 150 together with the ground potential (see FIG. 8). As described above, when the operational mode of the printer 1 changes to the "sleep state" (i.e., the power-saving mode), the supply of 3.3 VDC is stopped, but the supply of 1.8 VDC is maintained. Therefore, when the printer 1 is put into the sleep state, the printer 1 is unable to detect the corresponding temperature using the fixing temperature sensor TH1, but is still allowed to detect the corresponding temperature using the fixing temperature sensor TH2.

Subsequently, with reference to FIG. 10, an explanation will be provided of the fixing temperature sensor TH3 (i.e., the sensor configured to detect the temperature of the region around the other end of the heating roller 91 in the axial direction of the heating roller 91, see FIG. 2) and the nip detection sensor SE4 that are provided on the fuser 9. The fixing temperature sensor TH3 includes a variable resistor R2 configured to change its resistance value depending on the temperature to be detected. The nip detection sensor SE4 includes the light-emitting diode and the phototransistor Tr.

In addition, in order to reduce the number of terminals of the fuser connector 160 and the main body connector 150, the relay board 161 has a single common signal line configured to be used in common for respective signal lines of the fixing temperature sensor TH3 and the nip detection sensor SE4. Specifically, the relay board 161 is configured to relay (i.e., transmit) the respective signals from the fixing temperature sensor TH3 and the nip detection sensor SE4 to the main board 200 via a common terminal 253. The main board 200 includes a resistor R3 having a particular resistance value. The resistor R3 is connected at one end to a terminal of the ASIC 210, which is connected to the common terminal 253 and is configured to receive inputs of signals from the fixing temperature sensor TH3 and the nip detection sensor SE4. The resistor R3 is further connected at the other end to a 1.8 VDC power supply provided on the main board 200. Hereinafter, in the first illustrative embodiment, the resistor R3 (see FIG. 10) may be referred to as the "first resistor R3." In addition, the relay board 161 includes a combined resistor, which is an equivalent resistor formed by a variable resistor R2 and a resistor R4 that is connected in series with the variable resistor R2 and has a particular resistance value. Hereinafter, in the first illustrative embodiment, the resistor R4 (see FIG. 10) may be referred to as the "second resistor R4." The combined resistor is connected at one end to the ground GND of the relay board 161, and at the other end to the common terminal 253. The phototransistor Tr is connected in parallel with the combined resistor.

Specifically, the phototransistor Tr is connected at its emitter to the ground GND of the relay board 161, and at its collector to the common terminal 253.

As described above, when the pressure contact/separation mechanism of the fuser 9 is in the pressure contact state (see the upper drawing in FIG. 7) in which the heating roller 91 and the pressure roller 92 are in pressure contact with each other, light from the light-emitting diode is blocked by the flange 121B of the cam gear 121 and is not incident on the phototransistor Tr. When the phototransistor Tr is in an OFF state in which the light from the light-emitting diode is not incident on the phototransistor Tr, no electric current flows from the collector to the emitter of the phototransistor Tr. In this case, an electric current flows from the 1.8 VDC power supply on the main board 200 to the ground GND via the resistor R3, the variable resistor R2, and the resistor R4. On the other hand, the ASIC 210 includes an A/D conversion circuit 210C. Thus, according to the above electrical configuration with respect to the fixing temperature sensor TH3, while the pressure contact/separation mechanism of the fuser 9 is in the pressure contact state, an analog voltage obtained by dividing the voltage 1.8 V by the combined resistor and the resistor R3 is input to the A/D conversion circuit 210C of the ASIC 210. The ASIC 210 then identifies the temperature detected by the fixing temperature sensor TH3 using a digital value obtained through conversion by the A/D conversion circuit 210C.

An analog voltage Vin expressed by the following equation (3) is input to the A/D conversion circuit 210C.

$$Vin = 1.8\text{ V} \times (\text{variable } R2 + R4)/(\text{variable } R2 + R4 + R3) \qquad (3)$$

As shown above, the analog voltage Vin changes as the resistance value of the variable resistor R2 changes depending on the change in temperature to be detected by the fixing temperature sensor TH3. It is noted that "R1," "variable R2," "R3," and "R4" in the equation (3) represent the respective resistance values of the resistor R1, the variable resistor R2, the resistor R3, and the resistor R4.

On the other hand, as described above, when the pressure contact/separation mechanism of the fuser 9 is in the separation state (see the lower drawing in FIG. 7) in which the heating roller 91 and the pressure roller 92 are separated from each other, the light from the light-emitting diode is incident on the phototransistor Tr without being blocked by the flange 121B of the cam gear 121. When the phototransistor Tr is in an ON state in which the light from the light-emitting diode is incident on the phototransistor Tr, an electric current flows from the 1.8 VDC power supply on the main board 200 only to the collector and the emitter of the phototransistor Tr, which is considered to have a resistance substantially equal to 0. In this case, substantially no electric current flows to the resistor R3, the variable resistor R2, or the resistor R4.

Thus, according to the above electrical configuration with respect to the fixing temperature sensor TH3, while the pressure contact/separation mechanism of the fuser 9 is in the separation state, an analog voltage Vin expressed by the following equation (4) is input to the A/D conversion circuit 210C, assuming that the signal lines and the phototransistor Tr have a resistance of 0 and that the ground GND has a potential of 0 V.

$$Vin = 1.8\text{ V} - (R3 \times 1) = 0\text{ V} \qquad (4)$$

As shown above, the analog voltage Vin is a fixed voltage regardless of the temperature to be detected by the fixing temperature sensor TH3. It is noted that "R3" and "I" in the equation (4) represent the resistance value of the resistor R3 and an electric current value, respectively.

Figure 11:
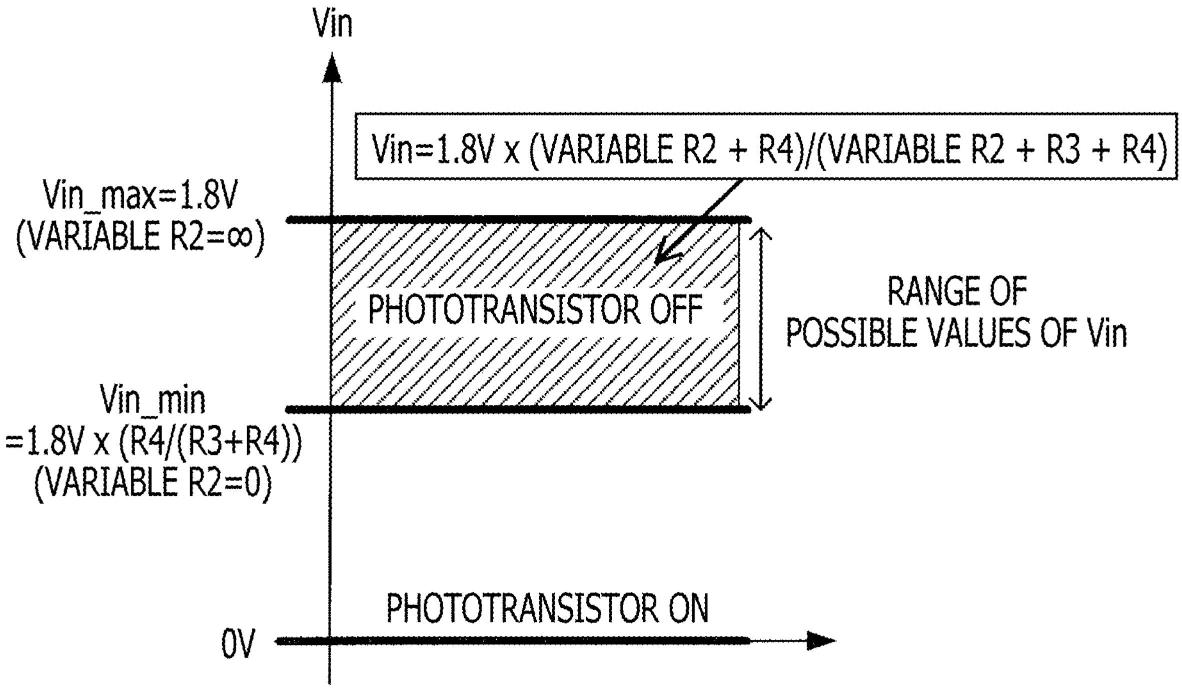
FIG. 11 illustrates possible values of an analog voltage to be input to an ASIC via a common terminal.

Thus, as shown in FIG. 11, when the phototransistor Tr is the OFF state, Vin≠0 V is input to the ASIC 210. In this case, it is possible to detect that the pressure contact/separation mechanism of the fuser 9 is in the pressure contact state in which the heating roller 91 and the pressure roller 92 are in pressure contact with each other. More specifically, the ASIC 210 is enabled to detect that the heating roller 91 and the pressure roller 92 are in pressure contact with each other to nip the sheet S therebetween, when the value of the voltage Vin is within a range of Vin_min(=1.8V×(R4/(R3+R4))) to Vin_max(=1.8 V). In addition, the ASIC 210 is enabled to detect the corresponding temperature of the heating roller 91 using the fixing temperature sensor TH3, based on the value of the analog voltage Vin. Namely, even though the fixing temperature sensor TH3 and the nip detection sensor SE4 are connected to the single common terminal 253, and the output signals from the fixing temperature sensor TH3 and the nip detection sensor SE4 are relayed to the main board 200 through the single common terminal 253, the ASIC 210 is enabled to detect whether the pressure contact/separation mechanism of the fuser 9 is in the pressure contact state or the separation state, and also to detect the corresponding temperature of the heating roller 91 using the fixing temperature sensor TH3.

On the other hand, when the phototransistor Tr is in the ON state, Vin=0 Vis input to the ASIC 210. In this case, it is possible to detect that the pressure contact/separation mechanism of the fuser 9 is in the separation state in which the heating roller 91 and the pressure roller 92 are separated from each other. While the pressure contact/separation mechanism of the fuser 9 is in the separation state, the ASIC 210 is unable to detect the corresponding temperature of the heating roller 91 using the fixing temperature sensor TH3. However, the ASIC 210 is enabled to detect the corresponding temperatures of the heating roller 91 using the other fixing temperature sensors TH1 and TH2. Therefore, it is possible to perform temperature control of the heater 93 without any problems. In addition, as will be described later, the temperature detected by the fixing temperature sensor TH3 is used to detect temperature abnormalities caused when printing is performed on sheets S having a width smaller than the specified size. Although the ASIC 210 is unable to detect the corresponding temperature of the heating roller 91 using the fixing temperature sensor TH3 while the pressure contact/separation mechanism of the fuser 9 is in the separation state, the ASIC 210 is enabled to detect the corresponding temperature of the heating roller 91 using the fixing temperature sensor TH3 and to detect the aforementioned temperature abnormalities while the pressure contact/separation mechanism of the fuser 9 is in the pressure contact state. Therefore, it is not a significant disadvantage that the ASIC 210 is unable to detect the corresponding temperature of the heating roller 91 using the fixing temperature sensor TH3 while the pressure contact/separation mechanism of the fuser 9 is in the separation state.

Control Processing by Controller

Next, with reference to FIG. 12, an explanation is provided focusing on a process (hereinafter, which may be referred to as a "temperature abnormality detecting process") to detect a temperature abnormality in the fuser 9 among various control processes to be performed by the ASIC 210 of the printer 1 configured as described above.

Figure 12:
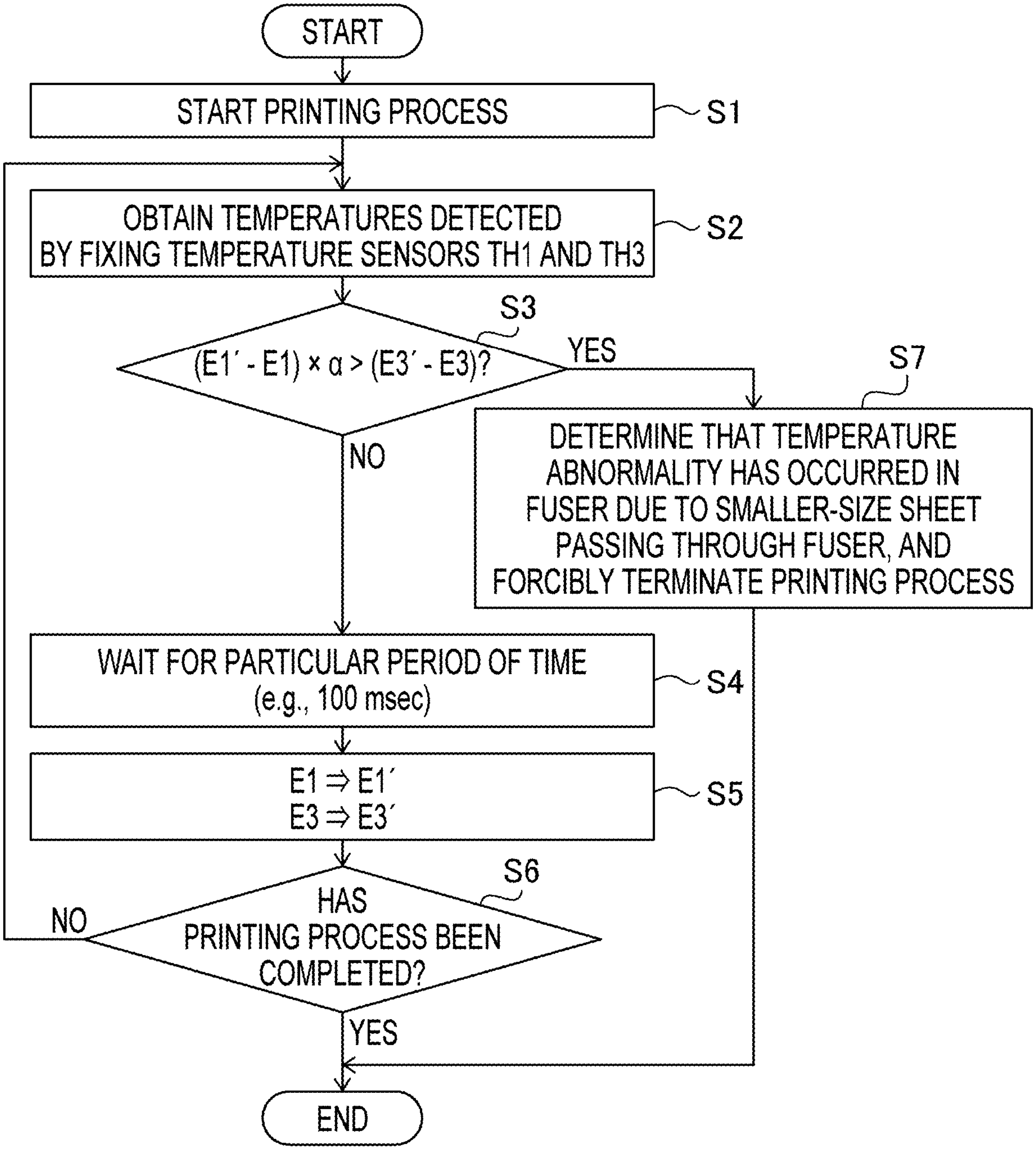
FIG. 12 is a flowchart showing a procedure of a temperature abnormality detecting process.

FIG. 12 is a flowchart showing a procedure of the temperature abnormality detecting process in a main process to be performed after the printer 1 is turned on. The individual operations and processes shown in FIG. 12 are performed by the ASIC 210 (which may be an example of a "controller" according to aspects of the present disclosure), e.g., in accordance with a program or instructions stored in a memory (e.g., the memory of the ASIC 210) of the printer 1.

First, in S1, the ASIC 210 starts a printing process according to a print command. The print command is sent from an external device such as a PC connected to the printer 1 in a wired or wireless manner via a network interface of the printer 1 together with image data that is a target to be printed. In another instance, the ASIC 210 may start the printing process in response to receiving an execution command for image formation via a user interface of the printer 1. When printing is started, as shown in FIG. 7, the ASIC 210 causes the pressure contact/separation mechanism of the fuser 9 to switch from the separation state to the pressure contact state by rotating the cams 97A and 97B in the fuser 9 and moving the pressure roller 92 with respect to the heating roller 91. In addition to driving the process unit 4 and the main motor 201A, the ASIC 210 controls the ON/OFF timing of 100 VAC to be supplied to the heater 93 based on the signals THM1 to THM3 from the fixing temperature sensors TH1 to TH3.

Next, in S2, the ASIC 210 obtains the temperature detected by the fixing temperature sensor TH1, which has a detection target region around the one end of the heating roller 91 in the axial direction of the heating roller 91 (see FIG. 2), and the temperature detected by the fixing temperature sensor TH3, which has a detection target region around the other end of the heating roller 91 in the axial direction of the heating roller 91 (see FIG. 2). Specifically, the ASIC 210 identifies the temperature detected by the fixing temperature sensor TH1 by converting the analog voltage Vin input to the A/D conversion circuit 210A (see FIG. 9). In addition, the ASIC 210 identifies the temperature detected by the fixing temperature sensor TH3 by converting the analog voltage Vin input to the A/D conversion circuit 210C (see FIG. 10). Since the details of the temperature detection by the fixing temperature sensors TH1 and TH3 have already been described with reference to FIGS. 9 and 10, a duplicate explanation thereof will be omitted. As described above, the fixing temperature sensor TH3 is unable to detect the corresponding temperature of the heating roller 91 while the pressure contact/separation mechanism of the fuser 9 is in the separation state. Therefore, the ASIC 210 basically executes S2 and the subsequent steps only when the pressure contact/separation mechanism is in the pressure contact state after printing is started.

Thereafter, in S3, the ASIC 210 compares the difference between a temperature E1' detected last time by the fixing temperature sensor TH1 and a temperature E1 detected this time by the fixing temperature sensor TH1, and the difference between a temperature E3' detected last time by the fixing temperature sensor TH3 and a temperature E3 detected this time by the fixing temperature sensor TH3, and determines whether the following equation (5) is satisfied.

$$(E1'-E1)\times\alpha>(E3'-E3) \tag{5}$$

In the equation (5), a is a specific coefficient that is set as appropriate. The temperatures E1' and E3' are stored in a memory (e.g., the memory of the ASIC 210) in the below-mentioned step S5.

As described with reference to FIG. 2, the sizes of sheets printable by the printer 1 include, as well as the specified size (e.g., A4) of sheets to be fed from the feed tray 13, other sizes of sheets S to be inserted from the multipurpose tray 14. As shown in FIG. 2, when printing is performed on a sheet S of the specified size, the sheet S passes between the heating roller 91 and the pressure roller 92 over substantially the entire width of the heating roller 91 in the axial direction of the heating roller 91. Meanwhile, when printing is performed on a sheet S having a width smaller than the specified size in the axial direction of the heating roller 91, the sheet S passes between the heating roller 91 and the pressure roller 92 along a path that is closer to the one end (i.e., the end close to the fixing temperature sensor TH1) than to the other end (i.e., the end close to the fixing temperature sensor TH3) of the heating roller 91 in the axial direction of the heating roller 91. Namely, the fixing temperature sensor TH3 is for detecting the temperature of a particular region of the heating roller 91 over which the sheet S does not pass when printing is performed on a sheet S having a width smaller than the specified size in the axial direction of the heating roller 91.

As described above, the heating roller 91 is heated by the heater 93 inside the heating roller 91. A part of the heat of the heating roller 91 heated by the heater 93 is absorbed by a sheet S passing between the heating roller 91 and the pressure roller 92 when printing is performed on the sheet S. Therefore, the printer 1 performs temperature control of the heater 93, assuming in advance that the temperature of the heating roller 91 will decrease due to the sheet S passing between the heating roller 91 and the pressure roller 92. However, in a case where printing is performed on a sheet S (hereinafter referred to as a "smaller-size sheet") having a width smaller than the specified size in the axial direction of the heating roller 91, the temperature of the particular region of the heating roller 91 over which the smaller-size sheet S does not pass does not decrease even when the smaller-size sheet S passes between the heating roller 91 and the pressure roller 92. Therefore, in this case, even if the printer 1 performs substantially the same temperature control as when printing is performed on the specified-size sheet S, the temperature of the particular region over which the smaller-size sheet S does not pass may be higher than a temperature assumed by the printer 1. In such a case, it is necessary to stop the temperature control of the heater 93 to heat the heating roller 91, before the temperature of the particular region exceeds an allowable range. Therefore, in S3, if the trend of changes in temperature to be detected by the fixing temperature sensor TH3 differs from the trend of changes in temperature to be detected by the fixing temperature sensor TH1 (more specifically, if an increase in the temperature to be detected by the fixing temperature sensor TH3 is significantly larger than an increase in the temperature to be detected by the fixing temperature sensor TH1), the ASIC 210 predicts that a temperature abnormality has occurred in the fuser 9 due to the smaller-size sheet S passing between the heating roller 91 and the pressure roller 92.

In response to determining that the condition in S3 is not satisfied, that is, determining that no temperature abnormality has occurred in the fuser 9 (S3: NO), the ASIC 210 waits for a particular period of time (e.g., 100 msec) (S4), and thereafter stores the temperature E1 detected this time by the fixing temperature sensor TH1 in the memory as E1' and stores the temperature E3 detected this time by the fixing temperature sensor TH3 in the memory as E3' (S5).

Thereafter, in S6, the ASIC 210 determines whether the printing process according to the print command has been completed.

In response to determining that the printing process according to the print command has been completed (S6: YES), the ASIC 210 terminates the temperature abnormality detecting process shown in FIG. 12. Meanwhile, in response to determining that the printing process according to the print command has not been completed (S6: NO), the ASIC 210 returns to S2 and continues to detect a temperature abnormality in the fuser 9.

On the other hand, in response to determining that the condition in S3 is satisfied, i.e., determining that a temperature abnormality has occurred in the fuser 9 due to a smaller-size sheet S (i.e., a sheet S having a width smaller than the specified size in the axial direction of the heating roller 91) passing between the heating roller 91 and the pressure roller 92 (S3: YES), the ASIC 210 forcibly terminates the printing process in order to suppress further temperature increase in the fuser 9 (S7). However, in S7, instead of terminating the printing process, the ASIC 210 may provide a warning to notify the user that a temperature abnormality has occurred in the fuser 9 and continue the printing process.

As described in detail above, the fuser 9 in the first illustrative embodiment is configured to be removably attached to the printer 1. The fuser 9 includes the heating roller 91 configured to heat a sheet S, the heater 93 configured to heat the heating roller 91, and the pressure roller 92 configured to nip the sheet S between the heating roller 91 and the pressure roller 92. The fuser 9 further includes the fixing temperature sensors TH1 to TH3 configured to detect the temperatures of the heating roller 91, the nip detection sensor SE4 configured to detect the state of the fuser 9, the fuser connector 160 configured to be connected to the main body connector 150 of the main body housing 2 when the fuser 9 is attached to the main body housing 2 of the printer 1, and the relay board 161 configured to relay (i.e., transmit) the signals from the fixing temperature sensors TH1 to TH3 and the nip detection sensor SE4 to the main body housing 2 of the printer 1. In particular, the signal from the fixing temperature sensor TH3 and the signal from the nip detection sensor SE4 are relayed to the main board 200 via the common terminal 253. Therefore, compared to known configurations. it is possible to reduce the number of signal lines for transmitting signals from the sensors included in the fuser 9 to the main body housing 2 of the printer 1, i.e., the number of signal lines connecting the fuser 9 and the main body housing 2 of the printer 1 to each other.

In addition, the temperature sensors provided on the fuser 9 include the fixing temperature sensor TH3 configured to detect a temperature of a particular region of the heating roller 91 over which a smaller-size sheet S (i.e., a sheet S having a width smaller than the specified size in the axial direction of the heating roller 91) does not pass, and the fixing temperature sensors TH1 and TH2 configured to detect temperatures of regions of the heating roller 91 over which the smaller-size sheet S passes. Further, the relay board 161 is configured to relay (i.e., transmit) the signal from the nip detection sensor SE4 and the signal from the fixing temperature sensor TH3 to the main body housing 2 of the printer 1 via the common terminal 253, and to relay the signals from the fixing temperature sensors TH1 and TH2 to the main body housing 2 of the printer 1 via the output terminals 251 and 252, respectively. Therefore, it is possible to detect the temperatures of the regions of the heating roller 91 over which the smaller-size sheet S passes and the temperature of the particular region of the heating roller 91 over which the smaller-size sheet S does not pass. Thus, in particular, it is possible to detect temperature abnormalities in the particular region over which the smaller-size sheet S does not pass.

Furthermore, even if a state in which it is difficult for some (i.e., one or more but not all) of the temperature sensors to detect the corresponding temperature(s) occurs as said some of the temperature sensors share the single common signal line with the nip detection sensor SE4, the other temperature sensors are still enabled to detect the respective temperatures. Thus, the ASIC 210 is enabled to perform appropriate temperature control of the heating roller 91. It is noted that, in the above explanation, "some of the temperature sensors" may refer to "one or more but not all of the temperature sensors." Nonetheless, in the first illustrative embodiment, one temperature sensor (i.e., the fixing temperature sensor TH3) actually shares the single common signal line with the nip detection sensor SE4.

Further, the fuser 9 further includes the pressure contact/separation mechanism configured to switch between the pressure contact state in which the heating roller 91 and the pressure roller 92 are in pressure contact with each other and the separation state in which the heating roller 91 and the pressure roller 92 are separated from each other. The nip detection sensor SE4 is configured to detect whether the pressure contact/separation mechanism is in the pressure contact state or the separation state. Thus, it is possible to achieve such a configuration that the nip detection sensor SE4 is enabled to detect whether the pressure contact/separation mechanism is in the pressure contact state or the separation state, and also to reduce the number of signal lines connecting the fuser 9 to the main body housing 2 of the printer 1.

Further, the printer 1 includes the main board 200 including the ASIC 210 configured to perform communication of signals with the fuser 9 via the main body connector 150. The ASIC 210 is connected to the main body connector 150 and is further configured to receive input of signals from the common terminal 253. The pressure contact/separation mechanism is configured to, when in the pressure contact state, block the light from the light-emitting section of the nip detection sensor SE4 by the gear (specifically, the flange 121B of the cam gear 121) included in the pressure contact/separation mechanism. The pressure contact/separation mechanism is further configured to, when in the separation state, not block the light from the light-emitting section of the nip detection sensor SE4 by the gear. The relay board 161 is configured to, when the light from the light-emitting section of the nip detection sensor SE4 is blocked, output a voltage corresponding to the temperature detected by the fixing temperature sensor TH3 from the common terminal 253 to the ASIC 210. The relay board 161 is further configured to, when the light from the light-emitting section of the nip detection sensor SE4 is not blocked, output a particular voltage from the common terminal 253 to the ASIC 210. Therefore, the ASIC 210 is enabled to determine whether the pressure contact/separation mechanism is in the pressure contact state or the separation state based on the voltage input to the ASIC 210 via the common terminal 253. Further, the ASIC 210 is enabled to identify the temperature detected by the fixing temperature sensor TH3 based on the voltage input to the ASIC 210 via the common terminal 253, when the pressure contact/separation mechanism is in the pressure contact state.

Further, the fixing temperature sensor TH3 includes the variable resistor R2 configured to change its resistance value depending on the temperature to be detected. The nip detection sensor SE4 includes the light-emitting diode and the phototransistor Tr. When the pressure contact/separation mechanism is in the pressure contact state, the light from the light-emitting diode is not incident on the phototransistor Tr. When the pressure contact/separation mechanism is in the separation state, the light from the light-emitting diode is incident on the phototransistor Tr. The ASIC 210 has the terminal configured to be connected to the common terminal 253. The main board 200 includes the resistor R3 that is connected at the one end thereof to the terminal of the ASIC 210 and at the other end thereof to the power supply (for 1.8 VDC) of the main board 200. The relay board 161 includes the combined resistor formed by the variable resistor R2 and the second resistor R4 connected in series with the variable resistor R2. The combined resistor is connected at the one end thereof to the ground GND of the relay board 161, and at the other end thereof to the common terminal 253. The phototransistor Tr is connected in parallel with the combined resistor. The phototransistor Tr is connected at its emitter to the ground GND of the relay board 161, and at its collector to the common terminal 253. Thus, when the phototransistor Tr is in the OFF state, a voltage different from 0 V is input to the ASIC 210. Therefore, the ASIC 210 is enabled to detect that the pressure contact/separation mechanism of the fuser 9 is in the pressure contact state in which the heating roller 91 and the pressure roller 92 are in pressure contact with each other. Meanwhile, when the phototransistor Tr is in the ON state, a voltage substantially equal to 0 V is input to the ASIC 210. Therefore, the ASIC 210 is enabled to detect that the pressure contact/separation mechanism of the fuser 9 is in the separation state in which the heating roller 91 and the pressure roller 92 are separated from each other. In addition, the ASIC 210 is enabled to detect the corresponding temperature of the heating roller 91 using the fixing temperature sensor TH3, based on the value of the voltage input to the ASIC 210. Namely, even though the fixing temperature sensor TH3 and the nip detection sensor SE4 are connected to the single common terminal 253, and the output signals from the fixing temperature sensor TH3 and the nip detection sensor SE4 are relayed to the main board 200 through the single common terminal 253, the ASIC 210 is enabled to detect whether the pressure contact/separation mechanism of the fuser 9 is in the pressure contact state or the separation state, and also to detect the corresponding temperature of the heating roller 91 using the fixing temperature sensor TH3.

The fixing temperature sensor TH3 is configured to detect the temperature of the particular region of the heating roller 91 over which a smaller-size sheet S (i.e., a sheet S having a width smaller than the specified size in the axial direction of the heating roller 91) does not pass when printing is performed on the smaller-size sheet S. The printer 1 includes the main board 200 including the ASIC 210 configured to perform communication of signals with the fuser 9 attached to the main body housing 9 of the printer 1 via the main body connector 150. The main board 200 is configured to store in a memory (e.g., the memory of the ASIC 210) the temperature detected by the fixing temperature sensor TH3 and to store in the memory the temperature detected by the fixing temperature sensor TH1. The ASIC 210 is configured to determine that the smaller-size sheet S is passing between the heating roller 91 and the pressure roller 92 (S7) when the trend of changes in temperature to be detected by the fixing temperature sensor TH3 differs from the trend of changes in temperature to be detected by the fixing temperature sensor TH1. Thus, it is possible to prevent in advance the occurrence of a temperature abnormality in the particular region over which the smaller-size sheet S does not pass when printing is performed on the smaller-size sheet S.

Second Illustrative Embodiment

Figure 13:
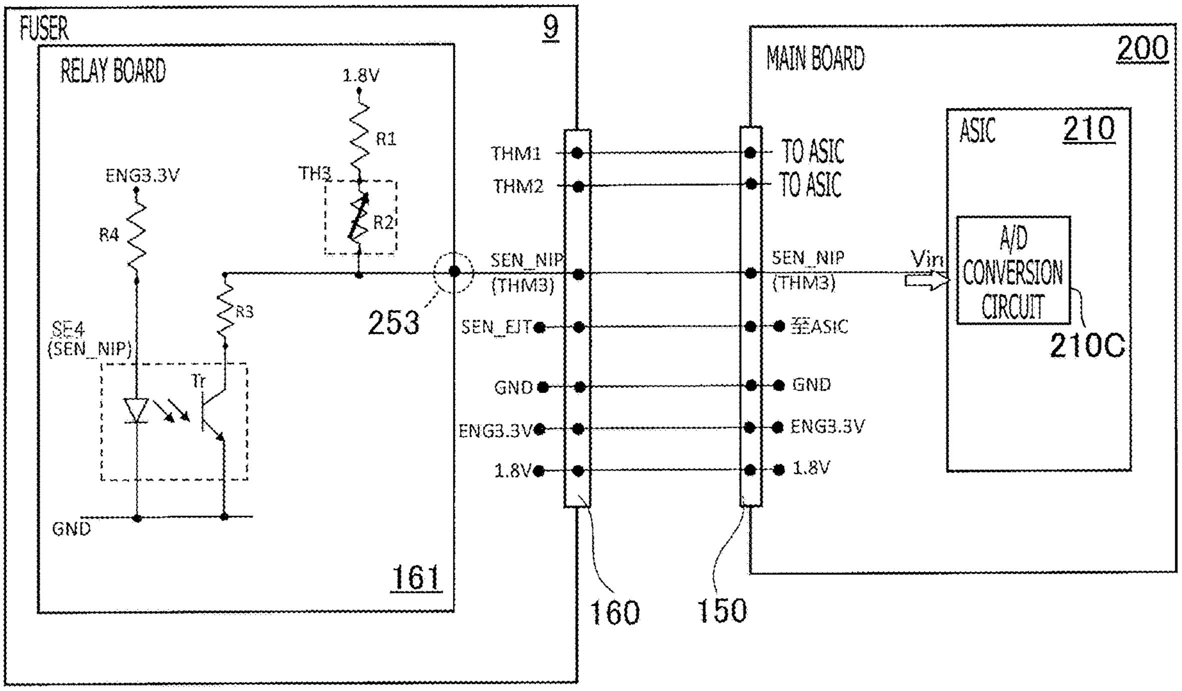
FIG. 13 shows an electrical configuration with respect to a fixing temperature sensor TH3 of a relay board of a fuser.

Next, a printer and a fuser in a second illustrative embodiment according to aspects of the present disclosure will be described with reference to FIGS. 13 and 14. In the following description of the second illustrative embodiment, the same reference characters as used in FIGS. 1 to 12 to describe the configurations of the printer 1 and the fuser 9 in the aforementioned first illustrative embodiment represent substantially the same (or equivalent) elements as those of the printer 1 and the fuser 9 in the first illustrative embodiment.

Schematic configurations of the printer and the fuser in the second illustrative embodiment are substantially the same as those of the printer 1 and the fuser 9 in the aforementioned first illustrative embodiment. Various control processes for the printer and the fuser in the second illustrative embodiment are substantially the same as those for the printer 1 and the fuser 9 in the first illustrative embodiment. However, among the configurations of the printer 1 and the fuser 9 in the first illustrative embodiment, in particular, the electrical configurations shown in FIG. 10 with respect to the fixing temperature sensor TH3 (i.e., the sensor configured to detect the temperature of the region around the other end of the heating roller 91 in the axial direction of the heating roller 91, see FIG. 2) and the nip detection sensor SE4 are different from the below-mentioned electrical configurations with respect to the fixing temperature sensor TH3 and the nip detection sensor SE4 in the second illustrative embodiment.

The fixing temperature sensor TH3 and the nip detection sensor SE4 included in the fuser 9 in the second illustrative embodiment are described below with reference to FIG. 13. The fixing temperature sensor TH3 includes a variable resistor R2 configured to change its resistance value depending on a temperature to be detected. The nip detection sensor SE4 includes a light-emitting diode and a phototransistor Tr.

In substantially the same manner as in the aforementioned first illustrative embodiment, in order to reduce the number of terminals of the fuser connector 160 and the main body connector 150, the relay board 161 has a single common signal line configured to be used in common for respective signal lines of the fixing temperature sensor TH3 and the nip detection sensor SE4. Specifically, the relay board 161 is configured to relay (i.e., transmit) the respective signals from the fixing temperature sensor TH3 and the nip detection sensor SE4 to the main board 200 via a common terminal 253. Further, the relay board 161 includes a combined resistor, which is an equivalent resistor formed by the variable resistor R2 and a resistor R1 that is connected in series with the variable resistor R2 and has a particular resistance value. Hereinafter, in the second illustrative embodiment, the resistor R1 (see FIG. 13) may be referred to as the "first resistor R1." Further, the relay board 161 includes a resistor R3 having a particular resistance value and connected at one end thereof to a collector of the phototransistor Tr and at the other end thereof to the common terminal 253. Hereinafter, in the second illustrative embodiment, the resistor R3 (see FIG. 13) may be referred to as the "second resistor R3." The combined resistor is connected at one end thereof to a 1.8 VDC power supply provided on the relay board 161, and at the other end thereof to the common terminal 253. The phototransistor Tr is connected at its emitter to the ground GND of the relay board 161, and at its collector to the common terminal 253 via the resistor R3.

In the second illustrative embodiment, as the position of the notch 121C of the flange 121B is adjusted, the relationship between the light-blocking state detected by the nip detection sensor SE4 and the state of the pressure contact/separation mechanism is reversed compared to the aforementioned first illustrative embodiment. Specifically, in the second illustrative embodiment, the light from the light-emitting section is transmitted through the notch 121C when the pressure contact/separation mechanism is in the pressure contact state in which the heating roller 91 and the pressure roller 92 are in pressure contact with each other as shown in the upper drawing of FIG. 7. In this case, the light-receiving section is allowed to receive the light from the light-emitting section. Meanwhile, the light from the light-emitting section is blocked by the gear (specifically, the flange 121B of the cam gear 121) included in the pressure contact/separation mechanism when the pressure contact/separation mechanism is in the separation state in which the heating roller 91 and the pressure roller 92 are separated from each other as shown in the lower drawing of FIG. 7.

Thus, when the pressure contact/separation mechanism of the fuser 9 is in the pressure contact state in which the heating roller 91 and the pressure roller 92 are in pressure contact with each other as shown in the upper drawing of FIG. 7, the light from the light-emitting diode is incident on the phototransistor Tr without being blocked by the flange 121B of the cam gear 121. When the phototransistor Tr is in the ON state in which the light is incident on the phototransistor Tr, an electric current flows from the 1.8 VDC power supply provided on the relay board 161 to the collector and the emitter of the phototransistor Tr. Namely, in this case, the electric current flows to the resistor R1, the variable resistor R2, and the resistor R3. The ASIC 210 has an A/D conversion circuit 210C. Thus, according to the above electrical configuration with respect to the fixing temperature sensor TH3, while the pressure contact/separation mechanism of the fuser 9 is in the pressure contact state, an analog voltage obtained by dividing the voltage 1.8 V by the combined resistor and the resistor R3 is input to the A/D conversion circuit 210C of the ASIC 210. The ASIC 210 then identifies the temperature detected by the fixing temperature sensor TH3 using a digital value obtained through conversion by the A/D conversion circuit 210C.

An analog voltage Vin expressed by the following equation (6) is input to the A/D conversion circuit 210C.

$$Vin = 1.8\ \mathrm{V} \times (R3/(\text{variable } R2 + R1 + R3)) \tag{6}$$

As shown above, the analog voltage Vin changes as the resistance value of the variable resistor R2 changes depending on the change in temperature to be detected by the fixing temperature sensor TH3. It is noted that "R1," "variable R2," and "R3" in the equation (6) represent the respective resistance values of the resistor R1, the variable resistor R2, and the resistor R3.

On the other hand, as described above, when the pressure contact/separation mechanism of the fuser 9 is in the separation state in which the heating roller 91 and the pressure roller 92 are separated from each other as shown in the lower drawing of FIG. 7, the light from the light-emitting diode is blocked by the flange 121B of the cam gear 121 and is not incident on the phototransistor Tr. When the phototransistor Tr is in the OFF state in which the light from the light-emitting diode is not incident on the phototransistor Tr, no electric current flows from the collector to the emitter of the phototransistor Tr. Namely, in this case, no electric current flows to the resistor R1, the variable resistor R2, or the resistor R3. Thus, according to the above electrical configuration with respect to the fixing temperature sensor TH3, while the pressure contact/separation mechanism of the fuser 9 is in the separation state, no voltage drop occurs. Therefore, an analog voltage of 1.8 V, which is the same as supplied by the 1.8 VDC power supply provided on the relay board 161, is input to the A/D conversion circuit 210C of the ASIC 210. As described above, the analog voltage Vin is a fixed voltage regardless of the temperature to be detected by the fixing temperature sensor TH3.

Figure 14:
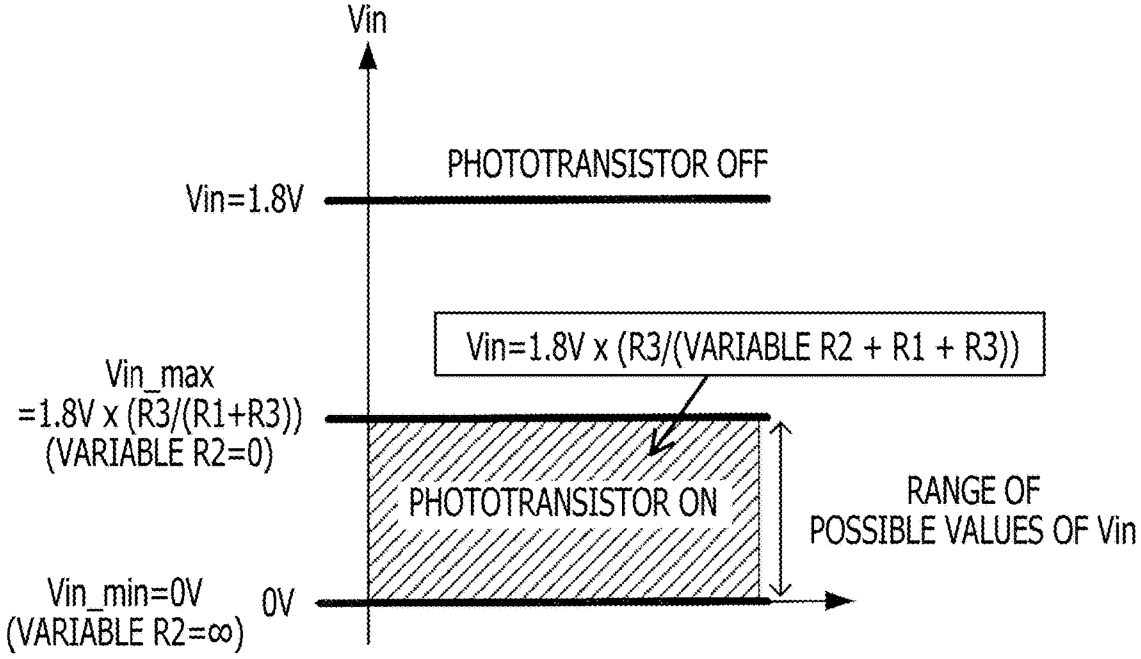
FIG. 14 illustrates possible values of an analog voltage to be input to an ASIC via a common terminal.

As a result, as shown in FIG. 14, when the phototransistor Tr is in the ON state, Vin #1.8V is input to the ASIC 210. Therefore, the ASIC 210 is enabled to detect that the pressure contact/separation mechanism of the fuser 9 is in the pressure contact state in which the heating roller 91 and the pressure roller 92 are in pressure contact with each other. More specifically, the ASIC 210 is enabled to detect that the heating roller 91 and the pressure roller 92 are in pressure contact with each other to nip the sheet S therebetween, when the value of the voltage Vin is within a range of Vin_min(=0V) to Vin_max(=1.8 V×(R3/(R1+R3))). Furthermore, the ASIC 210 is enabled to identify the temperature detected by the fixing temperature sensor TH3 based on the value of the analog voltage Vin. Namely, even though the fixing temperature sensor TH3 and the nip detection sensor SE4 are connected to the single common terminal 253, and the output signals from the fixing temperature sensor TH3 and the nip detection sensor SE4 are relayed to the main board 200 through the single common terminal 253, the ASIC 210 is enabled to detect whether the pressure contact/separation mechanism of the fuser 9 is in the pressure contact state or the separation state, and also to detect the corresponding temperature of the heating roller 91 using the fixing temperature sensor TH3.

On the other hand, when the phototransistor Tr is in the OFF state, Vin=1.8 Vis input to the ASIC 210. Therefore, when the voltage Vin input to the ASIC 210 is equal to 1.8 V, the ASIC 210 is enabled to detect that the pressure contact/separation mechanism of the fuser 9 is in the separation state in which the heating roller 91 and the pressure roller 92 are separated from each other. While the pressure contact/separation mechanism of the fuser 9 is in the separation state, the ASIC 210 is unable to detect the corresponding temperature of the heating roller 91 using the fixing temperature sensor TH3. However, even in this case, the ASIC 210 is enabled to detect the corresponding temperatures of the heating roller 91 using the other fixing temperature sensors TH1 and TH2. Therefore, it is possible to perform temperature control of the heater 93 without any problems. In addition, as described with reference to FIG. 12, the temperature detected by the fixing temperature sensor TH3 is used to detect a temperature abnormality caused when printing is performed on a smaller-size sheet S having a width smaller than the specified size in the axial direction of the heating roller 91. Although the ASIC 210 is unable to detect the corresponding temperature of the heating roller 91 using the fixing temperature sensor TH3 when the pressure contact/separation mechanism is in the separation state, the ASIC 210 is enabled to detect the corresponding temperature of the heating roller 91 using the fixing temperature sensor TH3 when the pressure contact/separation mechanism is in the pressure contact state. Therefore, it is not a significant disadvantage that the ASIC 210 is unable to detect the corresponding temperature of the heating roller 91 using the fixing temperature sensor TH3 when the pressure contact/separation mechanism is in the separation state.

As described in detail above, the printer 1 in the second illustrative embodiment includes the main board 200 including the ASIC 210 configured to perform communication of signals with the fuser 9 through the main body connector 150. The ASIC 210 is connected to the main body connector 150 and is configured to receive input of signals through the common terminal 253. The pressure contact/separation mechanism is configured to, when in the pressure contact state, not block the light from the light-emitting section of the nip detection sensor SE4 by the gear of the pressure contact/separation mechanism. The pressure contact/separation mechanism is further configured to, when in the separation state, block the light from the light-emitting section of the nip detection sensor SE4 by the gear of the pressure contact/separation mechanism. The relay board 161 is configured to supply an input voltage corresponding to the temperature detected by the fixing temperature sensor TH3 to the ASIC 210 through the common terminal 253 when the light from the light-emitting section of the nip detection sensor SE4 is not blocked. The relay board 161 is further configured to supply a particular input voltage to the ASIC 210 through the common terminal 253 when the light from the light-emitting section of the nip detection sensor SE4 is blocked. Thus, the ASIC 210 is enabled to determine whether the pressure contact/separation mechanism is in the pressure contact state or the separation state based on the voltage input to the ASIC 210. The ASIC 210 is further configured to identify the temperature detected by the fixing temperature sensor TH3 based on the voltage input to the ASIC 210, when the pressure contact/separation mechanism is in the pressure contact state.

In addition, the fixing temperature sensor TH3 includes the variable resistor R2 configured to change its resistance value depending on the temperature to be detected. The nip detection sensor SE4 includes the light-emitting diode and the phototransistor Tr. When the pressure contact/separation mechanism is in the pressure contact state, the light from the light-emitting diode is incident on the phototransistor Tr. When the pressure contact/separation mechanism is in the separation state, the light from the light-emitting diode is not incident on the phototransistor Tr. The relay board 161 includes the combined resistor formed by the variable resistor R2 and the first resistor R1 connected in series with the variable resistor R2, and the second resistor R3. The combined resistor is connected at the one end thereof to the 1.8 VDC power supply of the relay board 161, and at the other end thereof to the common terminal 253. The phototransistor Tr is connected at its emitter to the ground GND of the relay board 161, and at its collector to the common terminal 253 through the second resistor R3. Thus, when the phototransistor Tr is in the ON state, a voltage different from the voltage supplied by the 1.8 VDC power supply provided on the relay board 161 is input to the ASIC 210. Therefore, in this case, the ASIC 210 is enabled to detect that the pressure contact/separation mechanism is in the pressure contact state in which the heating roller 91 and the pressure roller 92 are in contact pressure with each other. On the other hand, when the phototransistor Tr is in the OFF state, the voltage supplied by the 1.8 VDC power supply provided on the relay board 161 is input to the ASIC 210. Therefore, when the voltage input to the ASIC 210 is equal to the voltage supplied by the 1.8 VDC power supply provided on the relay board 161, the ASIC 210 is enabled to detect that the pressure contact/separation mechanism is in the separation state in which the heating roller 91 and the pressure roller 92 are separated from each other. Further, the ASIC 210 is enabled to identify the temperature detected by the fixing temperature sensor TH3 based on the value of the voltage input to the ASIC 210 when the phototransistor Tr is in the ON state. Namely, even though the fixing temperature sensor TH3 and the nip detection sensor SE4 are connected to the single common terminal 253, and the output signals from the fixing temperature sensor TH3 and the nip detection sensor SE4 are relayed to the main board 200 through the single common terminal 253, the ASIC 210 is enabled to detect whether the pressure contact/separation mechanism of the fuser 9 is in the pressure contact state or the separation state, and also to detect the corresponding temperature of the heating roller 91 using the fixing temperature sensor TH3.

Third Illustrative Embodiment

Figure 15:
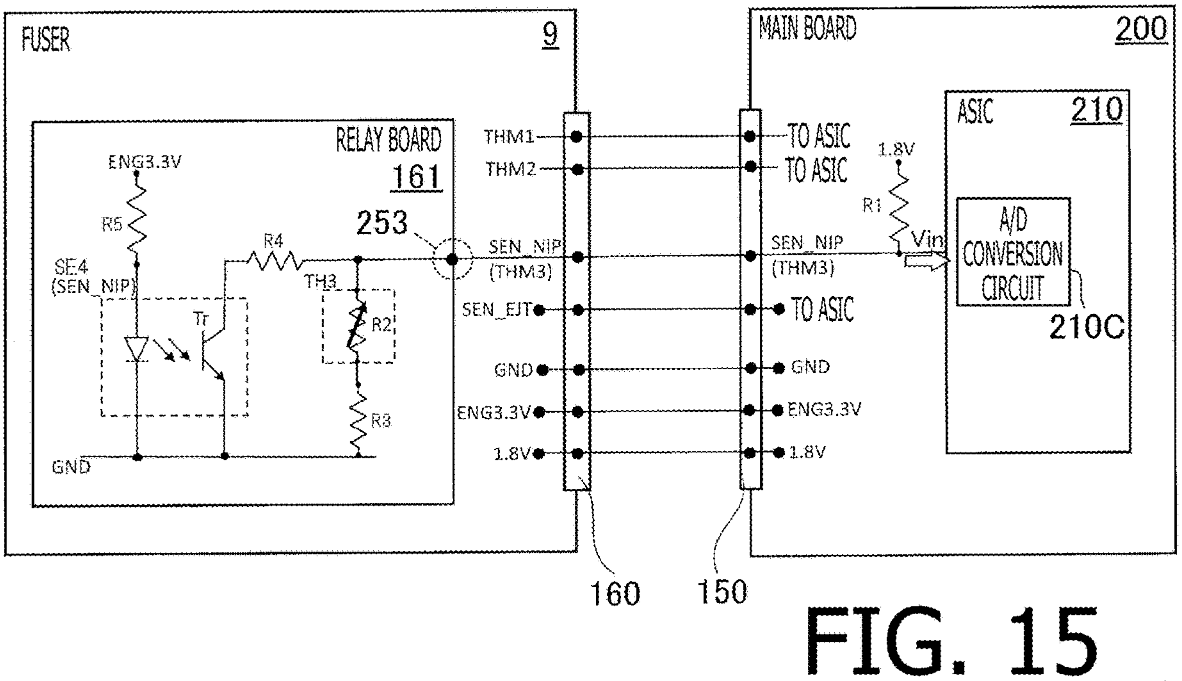
FIG. 15 shows an electrical configuration with respect to a fixing temperature sensor TH3 of a relay board of a fuser.

Next, a printer and a fuser in a third illustrative embodiment according to aspects of the present disclosure are described with reference to FIGS. 15 and 16. In the following description of the third illustrative embodiment, the same reference characters as used in FIGS. 1 to 12 to describe the configurations of the printer 1 and the fuser 9 in the aforementioned first illustrative embodiment represent substantially the same (or equivalent) elements as those of the printer 1 and the fuser 9 in the first illustrative embodiment.

Schematic configurations of the printer and the fuser in the third illustrative embodiment are substantially the same as those of the printer 1 and the fuser 9 in the aforementioned first illustrative embodiment. Various control processes for the printer and the fuser in the third illustrative embodiment are substantially the same as those for the printer 1 and the fuser 9 in the first illustrative embodiment. However, among the configurations of the printer 1 and the fuser 9 in the first illustrative embodiment, in particular, the electrical configurations shown in FIG. 10 with respect to the fixing temperature sensor TH3 (i.e., the sensor configured to detect the temperature of the region around the other end of the heating roller 91 in the axial direction of the heating roller 91, see FIG. 2) and the nip detection sensor SE4 are different from the below-mentioned electrical configurations with respect to the fixing temperature sensor TH3 and the nip detection sensor SE4 in the third illustrative embodiment.

The fixing temperature sensor TH3 and the nip detection sensor SE4 included in the fuser 9 in the third illustrative embodiment are described below with reference to FIG. 15. The fixing temperature sensor TH3 includes a variable resistor R2 configured to change its resistance value depending on a temperature to be detected. The nip detection sensor SE4 includes a light-emitting diode and a phototransistor Tr.

In substantially the same manner as in the aforementioned first illustrative embodiment, in order to reduce the number of terminals of the fuser connector 160 and the main body connector 150, the relay board 161 has a single common signal line configured to be used in common for respective signal lines of the fixing temperature sensor TH3 and the nip detection sensor SE4. Specifically, the relay board 161 is configured to relay (i.e., transmit) the respective signals from the fixing temperature sensor TH3 and the nip detection sensor SE4 to the main board 200 via a common terminal 253. The main board 200 includes a resistor R1 having a particular resistance value. The resistor R1 is connected at one end thereof to a terminal of the ASIC 210 that is connected to the common terminal 253 and is configured to receive input of signals from the fixing temperature sensor TH3 and the nip detection sensor SE4 via the common terminal 253, and at the other end thereof to a 1.8 VDC power supply provided on the main board 200. Hereinafter, in the third illustrative embodiment, the resistor R1 (see FIG. 15) may be referred to as the "first resistor R1." Further, the relay board 161 includes a combined resistor, which is an equivalent resistor formed by the variable resistor R2 and a resistor R3 that is connected in series with the variable resistor R2 and has a particular resistance value. Hereinafter, in the third illustrative embodiment, the resistor R3 (see FIG. 15) may be referred to as the "second resistor R3." Further, the relay board 161 includes a resistor R4 having a particular resistance value and connected at one end thereof to a collector of the phototransistor Tr and at the other end thereof to the common terminal 253. Hereinafter, in the third illustrative embodiment, the resistor R4 (see FIG. 15) may be referred to as the "third resistor R4." The combined resistor is connected at one end thereof to the ground GND of the relay board 161, and at the other end thereof to the common terminal 253. The phototransistor Tr and the resistor R4 are connected in parallel with the combined resistor. The phototransistor Tr is connected at its emitter to the ground GND of the relay board 161, and at its collector to the common terminal 253 via the resistor R4.

When the pressure contact/separation mechanism of the fuser 9 is in the pressure contact state in which the heating roller 91 and the pressure roller 92 are in pressure contact with each other as shown in the upper drawing of FIG. 7, the light from the light-emitting diode is blocked by the flange 121B of the cam gear 121 and is not incident on the phototransistor Tr. When the phototransistor Tr is in the OFF state in which the light from the light-emitting diode is not incident on the phototransistor Tr, no electric current flows from the collector to the emitter of the phototransistor Tr, and an electric current flows from the 1.8 VDC power supply provided on the main board 200 to the ground GND via the resistor R1, the variable resistor R2, and the resistor R3. On the other hand, the ASIC 210 includes an A/D conversion circuit 210C. Thus, according to the above electrical configuration with respect to the fixing temperature sensor TH3, while the pressure contact/separation mechanism is in the pressure contact state, an analog voltage obtained by dividing the voltage 1.8 V by the combined resistor and the resistor R1 is input to the A/D conversion circuit 210C of the ASIC 210. The ASIC 210 then identifies the temperature detected by the fixing temperature sensor TH3 using a digital value obtained through conversion by the A/D conversion circuit 210C.

An analog voltage Vin expressed by the following equation (7) is input to the A/D conversion circuit 210C.

$$Vin = 1.8\,\mathrm{V} \times (\text{variable } R2 + R3)/(\text{variable } R2 + R1 + R3) \quad (7)$$

As shown above, the analog voltage Vin changes as the resistance value of the variable resistor R2 changes depending on the change in temperature to be detected by the fixing temperature sensor TH3. It is noted that "R1," "variable R2," and "R3" in the equation (7) represent the respective resistance values of the resistor R1, the variable resistor R2, and the resistor R3.

On the other hand, as described above, when the pressure contact/separation mechanism of the fuser 9 is in the separation state in which the heating roller 91 and the pressure roller 92 are separated from each other as shown in the lower drawing of FIG. 7, the light from the light-emitting diode is incident on the phototransistor Tr without being blocked by the flange 121B of the cam gear 121. When the phototransistor Tr is in the ON state in which the light from the light-emitting diode is incident on the phototransistor Tr, an electric current flows from the 1.8 VDC power supply provided on the main board 200 to the collector and the emitter of the phototransistor Tr. More specifically, an electric current flows from the 1.8 VDC power supply provided on the main board 200 to the ground GND of the relay board 161 via the resistor R1, the variable R2, and the resistor R3, and also to the ground GND of the relay board 161 via the resistor R1, the resistor R4, and the phototransistor Tr. On the other hand, the ASIC 210 includes the A/D conversion circuit 210C. Thus, according to the above electrical configuration with respect to the fixing temperature sensor TH3, while the pressure contact/separation mechanism is in the separation state, an analog voltage obtained by dividing the voltage 1.8 V by a parallel resistor (which is an equivalent resistor formed by the combined resistor and the resistor R4 that are connected in parallel with each other) and the resistor R1 is input to the A/D conversion circuit 210C of the ASIC 210. The ASIC 210 then identifies the temperature detected by the fixing temperature sensor TH3 using a digital value obtained through conversion by the A/D conversion circuit 210C.

An analog voltage Vin expressed by the following equations (8) and (9) is input to the A/D conversion circuit 210C.

$$Vin = 1.8\,\mathrm{V} \times (Rh/(R1 + Rh)) \quad (8)$$

$$1/Rh = 1/R4 + 1/(\text{variable } R2 + R3) \quad (9)$$

As shown above, the analog voltage Vin changes as the resistance value of the variable resistor R2 changes depending on the change in temperature to be detected by the fixing temperature sensor TH3. It is noted that "Rh," "R1," "variable R2," "R3," and "R4" in the equations (8) and (9) represent the respective resistance values of the parallel resistor, the resistor R1, the variable resistor R2, the resistor R3, and the resistor R4.

Figure 16:
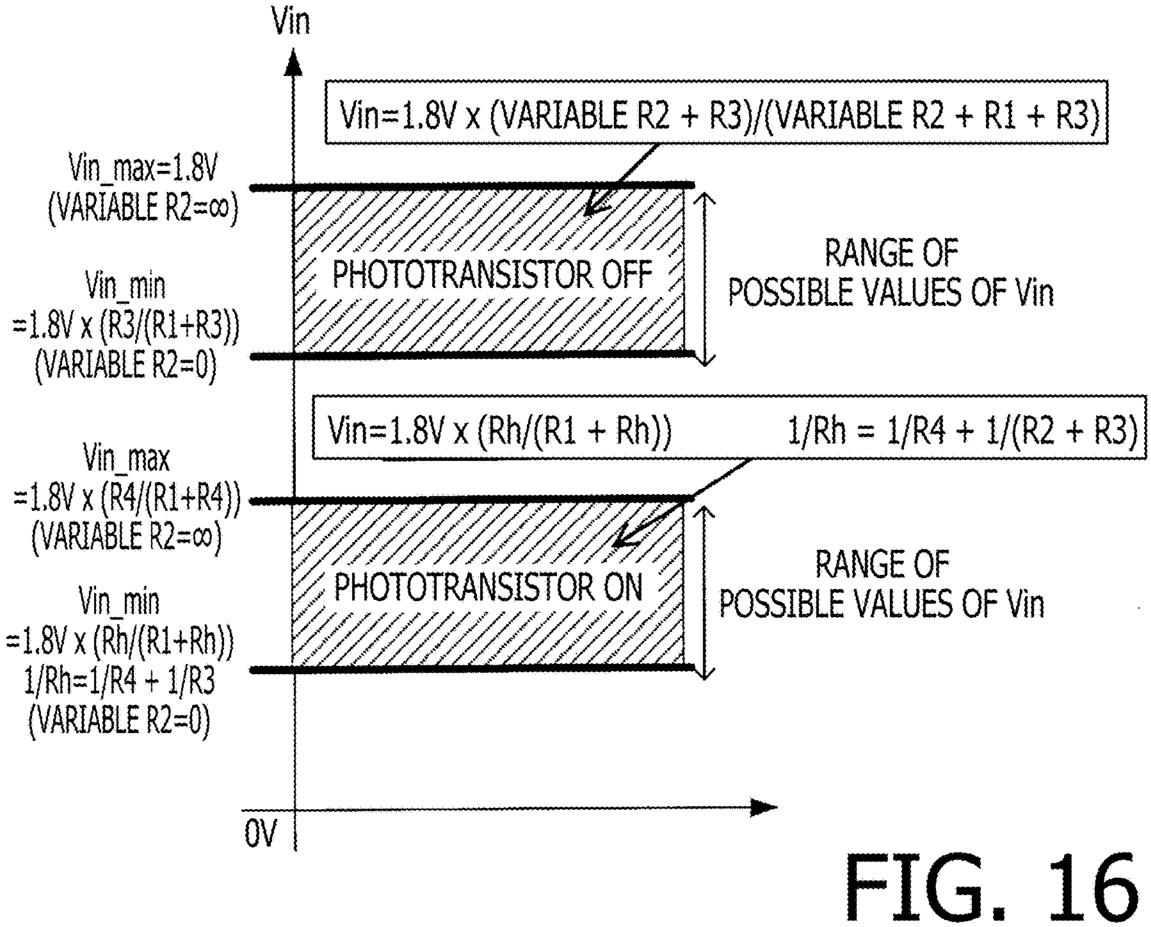
FIG. 16 illustrates possible values of an analog voltage to be input to an ASIC via a common terminal.

As a result, as shown in FIG. 16, the ranges of the value of the voltage Vin to be input to the ASIC 210 are different between a case where the phototransistor Tr is in the OFF state and a case where the phototransistor Tr is in the ON state. Therefore, the ASIC 210 is enabled to detect whether the pressure contact/separation mechanism of the fuser 9 is in the pressure contact state in which the heating roller 91 and the pressure roller 92 are in pressure contact with each other or in the separation state in which the heating roller 91 and the pressure roller 92 are separated from each other, based on the value of the voltage Vin input to the ASIC 210. More specifically, the ASIC 210 is enabled to detect that the heating roller 91 and the pressure roller 92 are in pressure contact with each other to nip the sheet S therebetween, when the value of the voltage Vin is within a range of Vin_min(=1.8 V×(R3/(R1+R3))) to Vin_max(=1.8 V). On the other hand, the ASIC 210 is enabled to identify the temperature detected by the fixing temperature sensor TH3 based on the value of the analog voltage Vin. Namely, even though the fixing temperature sensor TH3 and the nip detection sensor SE4 are connected to the single common terminal 253, and the output signals from the fixing temperature sensor TH3 and the nip detection sensor SE4 are relayed to the main board 200 through the single common terminal 253, the ASIC 210 is enabled to detect whether the pressure contact/separation mechanism of the fuser 9 is in the pressure contact state or the separation state, and also to detect the corresponding temperature of the heating roller 91 using the fixing temperature sensor TH3.

On the other hand, the ASIC 210 is enabled to detect that the pressure contact/separation mechanism is in the separation state in which the heating roller 91 and the pressure roller 92 are separated from each other, when the value of Vin is within a range of Vin_min(=1.8 V×(Rh/(R1+Rh)), where 1/Rh=1/R4+1/R3) to Vin_max(=1.8 V×(R4/(R1+R4))). In the third illustrative embodiment, the ASIC 210 is enabled to detect the corresponding temperature of the heating roller 91 using the fixing temperature sensor TH3 even when the pressure contact/separation mechanism is in the separation state.

As described in detail above, the printer 1 in the third illustrative embodiment has the variable resistor R2 configured to change its resistance value depending on the temperature to be detected. The nip detection sensor SE4 includes the light-emitting diode and the phototransistor. When the pressure contact/separation mechanism is in the pressure contact state, the light from the light-emitting diode is not incident on the phototransistor Tr. When the pressure contact/separation mechanism is in the separation state, the light from the light-emitting diode is incident on the phototransistor Tr. The ASIC 210 has the terminal configured to be connected to the common terminal 253. The main board 200 includes the first resistor R1 that is connected at the one end thereof to the terminal of the ASIC 210 and at the other end thereof to the 1.8 VDC power supply of the main board 200. The relay board 161 includes the combined resistor formed by the variable resistor R2 and the second resistor R3 connected in series with the variable resistor R2, and the third resistor R4. The combined resistor is connected at the one end thereof to the ground GND of the relay board 161, and at the other end thereof to the common terminal 253. The phototransistor Tr is connected in parallel with the combined resistor. The phototransistor Tr is connected at its emitter to the ground GND of the relay board 161 and at its collector to the common terminal 253 via the third resistor R4. Thus, the ranges of the value of the voltage Vin to be input to the ASIC 210 are different between the case where the phototransistor Tr is in the OFF state and the case where the phototransistor Tr is in the ON state. Therefore, the ASIC 210 is enabled to detect whether the pressure contact/separation mechanism is in the pressure contact state in which the heating roller 91 and the pressure roller 92 are in pressure contact with each other, or in the separation state in which the heating roller 91 and the pressure roller 92 are separated from each other, based on the value of the voltage Vin input to the ASIC 210. Further, the ASIC 210 is enabled to identify the temperature detected by the fixing temperature sensor TH3 based on the value of the voltage Vin input to the ASIC 210. Namely, even though the fixing temperature sensor TH3 and the nip detection sensor SE4 are connected to the single common terminal 253, and the output signals from the fixing temperature sensor TH3 and the nip detection sensor SE4 are relayed to the main board 200 through the single common terminal 253, the ASIC 210 is enabled to detect whether the pressure contact/separation mechanism of the fuser 9 is in the pressure contact state or the separation state, and also to detect the corresponding temperature of the heating roller 91 using the fixing temperature sensor TH3.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential modifications according to aspects of the present disclosure are provided below.

For instance, in the aforementioned illustrative embodiments, the fuser 9 includes the three fixing temperature sensors TH1 to TH3 to detect the corresponding temperatures of the heating roller 91. However, in another instance, the number of fixing temperature sensors may not necessarily be three, and may be two or four or more. Furthermore, in the aforementioned illustrative embodiments, the signals from the fixing temperature sensor TH3 and the nip detection sensor SE4 are output to the main body housing 2 through the common terminal 253. However, in another instance, the signals from one of the fixing temperature sensors TH1 and TH2 and from the nip detection sensor SE4 may be output to the main body housing 2 through the common terminal 253.

In the aforementioned illustrative embodiments, the trend of changes in temperature detected by the fixing temperature sensor TH1 is compared with the trend of changes in temperature detected by the fixing temperature sensor TH3 in S3. However, in another instance, the trend of changes in temperature detected by the fixing temperature sensor TH2 may be compared with the trend of changes in temperature detected by the fixing temperature sensor TH3 in S3.

In the aforementioned illustrative embodiments, the printer 1 has been described as an example of the "image forming apparatus" according to aspects of the present disclosure. However, examples of the "image forming apparatus" according to aspects of the present disclosure may include, but are not limited to, a copier, a facsimile machine, and a multi-function peripheral having a printing function and a scanning function.

The following provides examples of associations between elements depicted in the aforementioned illustrative embodiment(s) and modification(s), and elements claimed according to aspects of the present disclosure. For instance, the printer 1 may be an example of an "image forming apparatus" according to aspects of the present disclosure. The fuser 9 may be an example of a "fuser" according to aspects of the present disclosure. The heating roller 91 may be an example of a "heating rotatable body" according to aspects of the present disclosure. The heater 93 may be an example of a "heater" according to aspects of the present disclosure. The pressure roller 92 may be an example of a "pressure rotatable body" according to aspects of the present disclosure. The fixing temperature sensor TH3 may be an example of a "temperature sensor" according to aspects of the present disclosure, and may be an example of a "first temperature sensor" according to aspects of the present disclosure. The fixing temperature sensors TH1 and TH2 may be included in examples of a "second temperature sensor" according to aspects of the present disclosure. The nip detection sensor SE4 may be an example of a "state detection sensor" according to aspects of the present disclosure, and may be an example of a "nip detection sensor" according to aspects of the present disclosure. The fuser connector 160 may be an example of a "fuser connector" according to aspects of the present disclosure. The relay board 161 may be an example of a "relay board" according to aspects of the present disclosure. The main body connector 150 may be an example of a "main body connector" according to aspects of the present disclosure. The main board 200 may be an example of a "control board" according to aspects of the present disclosure. The ASIC 210 may be an example of a "controller" according to aspects of the present disclosure. The flange 121B of the cam gear 121 included in the pressure contact/separation mechanism may be an example of a "gear" included in a "pressure contact/separation mechanism" according to aspects of the present disclosure.

What is claimed is:

1. A fuser configured to be removably attached to an image forming apparatus, comprising:

a heating rotatable body configured to heat a sheet;

a heater configured to heat the heating rotatable body;

a pressure rotatable body configured to nip the sheet between the pressure rotatable body and the heating rotatable body;

a temperature sensor configured to detect a temperature of the heating rotatable body;

a state detection sensor configured to detect a state of the fuser;

a fuser connector configured to be connected to a main body connector of the image forming apparatus when the fuser is attached to the image forming apparatus; and a relay board comprising a common terminal connected to the fuser connector, the relay board being connected to the temperature sensor and the state detection sensor, the relay board being configured to transmit respective signals output from the temperature sensor and the state detection sensor to the image forming apparatus via the common terminal.

2. The fuser according to claim 1, further comprising:

a plurality of temperature sensors including:

said temperature sensor as a first temperature sensor configured to detect a temperature of a first region of the heating rotatable body over which the sheet does not pass; and a second temperature sensor configured to detect a temperature of a second region of the heating rotatable body over which the sheet passes, wherein the relay board further comprises an output terminal, and wherein the relay board is further configured to:

transmit respective signals output from the first temperature sensor and the state detection sensor to the image forming apparatus via the common terminal; and transmit a signal output from the second temperature sensor to the image forming apparatus via the output terminal.

3. An image forming apparatus comprising:

the fuser according to claim 2; and a control board comprising a controller connected to the main body connector of the image forming apparatus, the controller being configured to perform communication of signals with the fuser as attached to the image forming apparatus via the main body connector, wherein the first temperature sensor is further configured to detect the temperature of the first region of the heating rotatable body over which a smaller-size sheet does not pass when printing is performed on the smaller-size sheet, the smaller-size sheet having a width smaller than a specified size in an axial direction of the heating rotatable body, wherein the second temperature sensor is further configured to detect the temperature of the second region of the heating rotatable body over which the smaller-size sheet passes when printing is performed on the smaller-size sheet, wherein the control board is configured to store the temperature detected by the first temperature sensor in a memory, and to store the temperature detected by the second temperature sensor in the memory, and wherein the controller is further configured to determine that the smaller-size sheet is passing through the fuser when a trend of changes in the temperature detected by the first temperature sensor is different from a trend of changes in the temperature detected by the second temperature sensor.

4. The fuser according to claim 1, further comprising a pressure contact/separation mechanism comprising a gear and configured to switch between a pressure contact state, in which the heating rotatable body and the pressure rotatable body are in pressure contact with each other, and a separation state, in which the heating rotatable body and the pressure rotatable body are separated from each other, wherein the state detection sensor is a nip detection sensor configured to detect whether the pressure contact/separation mechanism is in the pressure contact state or the separation state.

5. An image forming apparatus comprising:

the fuser according to claim 4; and a control board comprising a controller connected to the main body connector of the image forming apparatus, the controller being configured to perform communication of signals with the fuser as attached to the image forming apparatus via the main body connector, and to receive input of signals transmitted via the common terminal, wherein the pressure contact/separation mechanism is further configured to:

when in the pressure contact state, block light from the nip detection sensor by the gear; and when in the separation state, not block the light from the nip detection sensor by the gear, and wherein the relay board is further configured to:

when the light from the nip detection sensor is blocked, input a voltage corresponding to the temperature to be detected by the temperature sensor to the controller through the common terminal; and when the light from the nip detection sensor is not blocked, input a particular voltage to the controller through the common terminal.

6. The image forming apparatus according to claim 5,
wherein the temperature sensor comprises a variable resistor configured to change a resistance value thereof depending on the temperature to be detected by the temperature sensor,
wherein the nip detection sensor comprises a light-emitting diode and a phototransistor, and the fuser is further configured to make light from the light-emitting diode not incident on the phototransistor when the pressure contact/separation mechanism is in the pressure contact state, and to make the light from the light-emitting diode incident on the phototransistor when the pressure contact/separation mechanism is in the separation state,
wherein the controller is configured to be connected to the common terminal via a terminal of the controller,
wherein the control board further comprises a first resistor having one end connected to the terminal and another end connected to a power supply of the control board,
wherein the relay board further comprises a combined resistor formed by the variable resistor and a second resistor connected in series with the variable resistor, the combined resistor having one end connected to ground of the relay board and another end connected to the common terminal, and
wherein the phototransistor is connected in parallel with the combined resistor, the phototransistor having an emitter connected to the ground of the relay board and a collector connected to the common terminal.

7. The image forming apparatus according to claim 5,
wherein the temperature sensor comprises a variable resistor configured to change a resistance value thereof depending on the temperature to be detected by the temperature sensor,
wherein the nip detection sensor comprises a light-emitting diode and a phototransistor, and the fuser is further configured to make light from the light-emitting diode not incident on the phototransistor when the pressure contact/separation mechanism is in the pressure contact state, and to make the light from the light-emitting diode incident on the phototransistor when the pressure contact/separation mechanism is in the separation state,
wherein the controller is further configured to be connected to the common terminal via a terminal of the controller,
wherein the control board further comprises a first resistor having one end connected to the terminal and another end connected to a power supply of the control board,
wherein the relay board further comprises a combined resistor formed by the variable resistor and a second resistor connected in series with the variable resistor, and a third resistor, the combined resistor having one end connected to ground of the relay board and another end connected to the common terminal, and
wherein the phototransistor is connected in parallel with the combined resistor, the phototransistor having an emitter connected to the ground of the relay board and a collector connected to the common terminal via the third resistor.

8. An image forming apparatus comprising:
the fuser according to claim 4; and
a control board comprising a controller connected to the main body connector of the image forming apparatus, the controller being configured to perform communication of signals with the fuser as attached to the image forming apparatus via the main body connector, and to receive input of signals transmitted via the common terminal,
wherein the pressure contact/separation mechanism is further configured to:
when in the pressure contact state, not block light from the nip detection sensor by the gear; and
when in the separation state, block the light from the nip detection sensor by the gear, and
wherein the relay board is further configured to:
when the light from the nip detection sensor is not blocked, input a voltage corresponding to the temperature to be detected by the temperature sensor to the controller through the common terminal; and
when the light from the nip detection sensor is blocked, input a particular voltage to the controller through the common terminal.

9. The image forming apparatus according to claim 8,
wherein the temperature sensor comprises a variable resistor configured to change a resistance value thereof depending on the temperature to be detected by the temperature sensor,
wherein the nip detection sensor comprises a light-emitting diode and a phototransistor, and the fuser is further configured to make light from the light-emitting diode incident on the phototransistor when the pressure contact/separation mechanism is in the pressure contact state, and to make the light from the light-emitting diode not incident on the phototransistor when the pressure contact/separation mechanism is in the separation state,
wherein the relay board further comprises a combined resistor formed by the variable resistor and a first resistor connected in series with the variable resistor, and a second resistor, the combined resistor having one end connected to a power supply of the relay board and another end connected to the common terminal, and
wherein the phototransistor has an emitter connected to ground of the relay board and a collector connected to the common terminal via the second resistor.

* * * * *